(12) United States Patent
Stonick et al.

(10) Patent No.: US 7,263,122 B2
(45) Date of Patent: Aug. 28, 2007

(54) RECEIVER BASED DECISION FEEDBACK EQUALIZATION CIRCUITRY AND TECHNIQUES

(75) Inventors: John T. Stonick, Portland, OR (US);
Jeffrey L. Sonntag, Portland, OR (US);
Daniel Keith Weinlader, Portland, OR (US)

(73) Assignee: Synopsys, Inc., Mountain View, CA (US)

( * ) Notice: Subject to any disclaimer, the term of this patent is extended or adjusted under 35 U.S.C. 154(b) by 777 days.

(21) Appl. No.: 10/630,991

(22) Filed: Jul. 29, 2003

(65) Prior Publication Data

US 2005/0025228 A1 Feb. 3, 2005

(51) Int. Cl.
*H03H 7/30* (2006.01)
*H03H 7/40* (2006.01)
*H03K 5/159* (2006.01)

(52) U.S. Cl. .................. 375/232; 375/233; 375/340
(58) Field of Classification Search ............... 375/232, 375/350, 233, 234, 340
See application file for complete search history.

(56) References Cited

U.S. PATENT DOCUMENTS

| | | | | |
|---|---|---|---|---|
| 5,712,873 | A * | 1/1998 | Shiue et al. | 375/233 |
| 6,505,222 | B1 * | 1/2003 | Davis et al. | 708/323 |
| 2002/0021646 | A1 * | 2/2002 | Redman-White et al. | 369/59.22 |
| 2002/0075012 | A1 * | 6/2002 | Tang et al. | 324/614 |
| 2002/0094024 | A1 * | 7/2002 | Ma et al. | 375/226 |
| 2003/0081697 | A1 * | 5/2003 | Little | 375/317 |
| 2004/0120426 | A1 * | 6/2004 | Dagdeviren et al. | 375/340 |
| 2005/0002474 | A1 * | 1/2005 | Limberg | 375/321 |

OTHER PUBLICATIONS

"Pipelining in Algorithms with Quantizer Loops", K. Parhi, IEEE Transactions on Circuits and Systems, vol. 38, No. 7, Jul. 1991, pp. 745-754.

* cited by examiner

*Primary Examiner*—Phuong Phu
(74) *Attorney, Agent, or Firm*—Park, Vaughan & Fleming, LLP

(57) ABSTRACT

In one aspect, the present invention is directed to a technique of, and circuitry and system for enhancing the performance of data communication systems using receiver based decision feedback equalization circuitry. In one embodiment, the equalization circuitry and technique employs a plurality of data slicers (for example, two) to receive an analog input and output a binary value based on the reference or slicer level. The output of the data slicers is provided to logic circuitry to determine whether the analog input was a binary high or binary low. In those instances where the data slicers "agree" and both indicate either a high or a low, the logic circuitry outputs the corresponding binary value. In those instances where the data slicer do not "agree"—that is, where one data slicer indicates the input to be a binary or logic high value and the other data slicer indicates the input to be a binary or logic low value, in one embodiment, the logic circuitry outputs the complement of the previous binary value. In another embodiment, the logic circuitry selects the output from the slicer that changed its output from the previous binary value. In yet another embodiment where the slicers do not "agree", the logic circuitry selects the decision of the data slicer with higher slicer value if the previous binary value was "high", or selects the decision of the data slicer with the lower slicer value if the previous binary value was "low". The data slicers employ slicer levels that may be fixed, pre-programmed, predetermined, preset, changed, modified, optimized, enhanced and/or programmed or re-programmed (for example, adaptively) before or during operation of the decision feedback equalization circuitry.

26 Claims, 27 Drawing Sheets

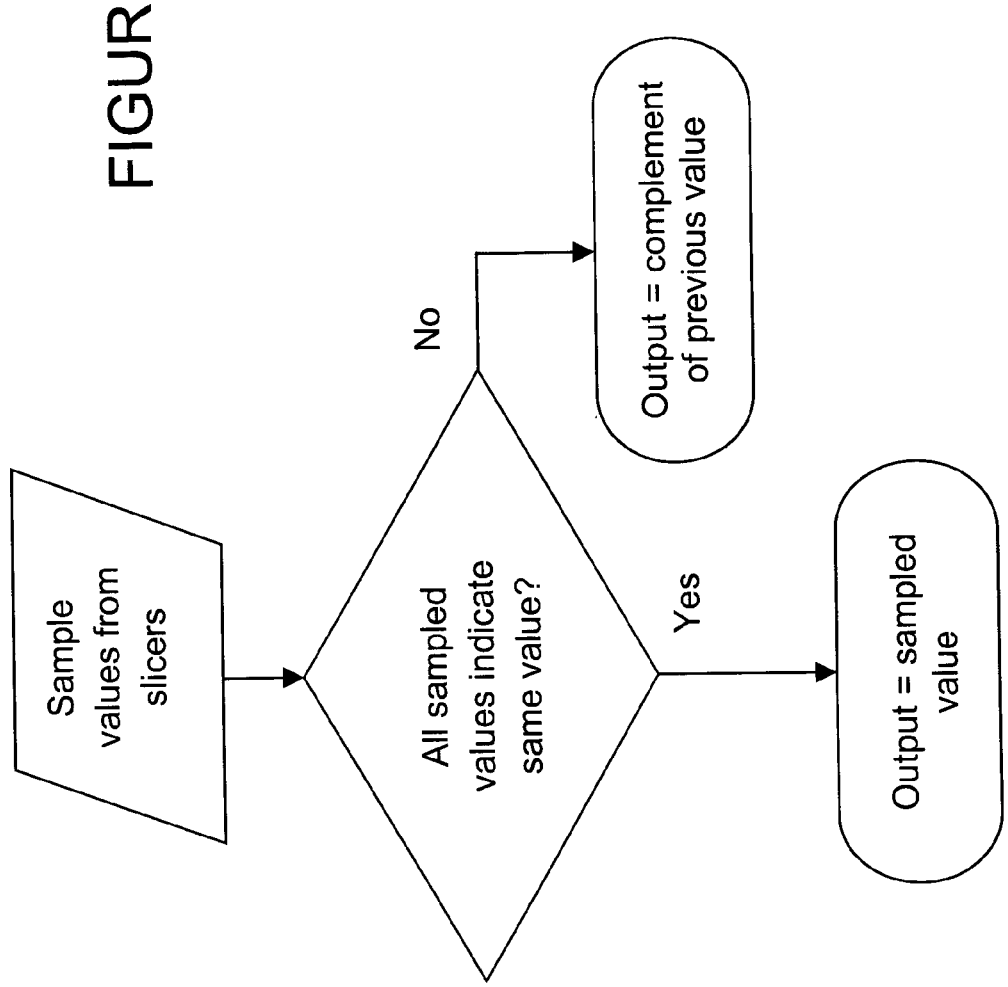

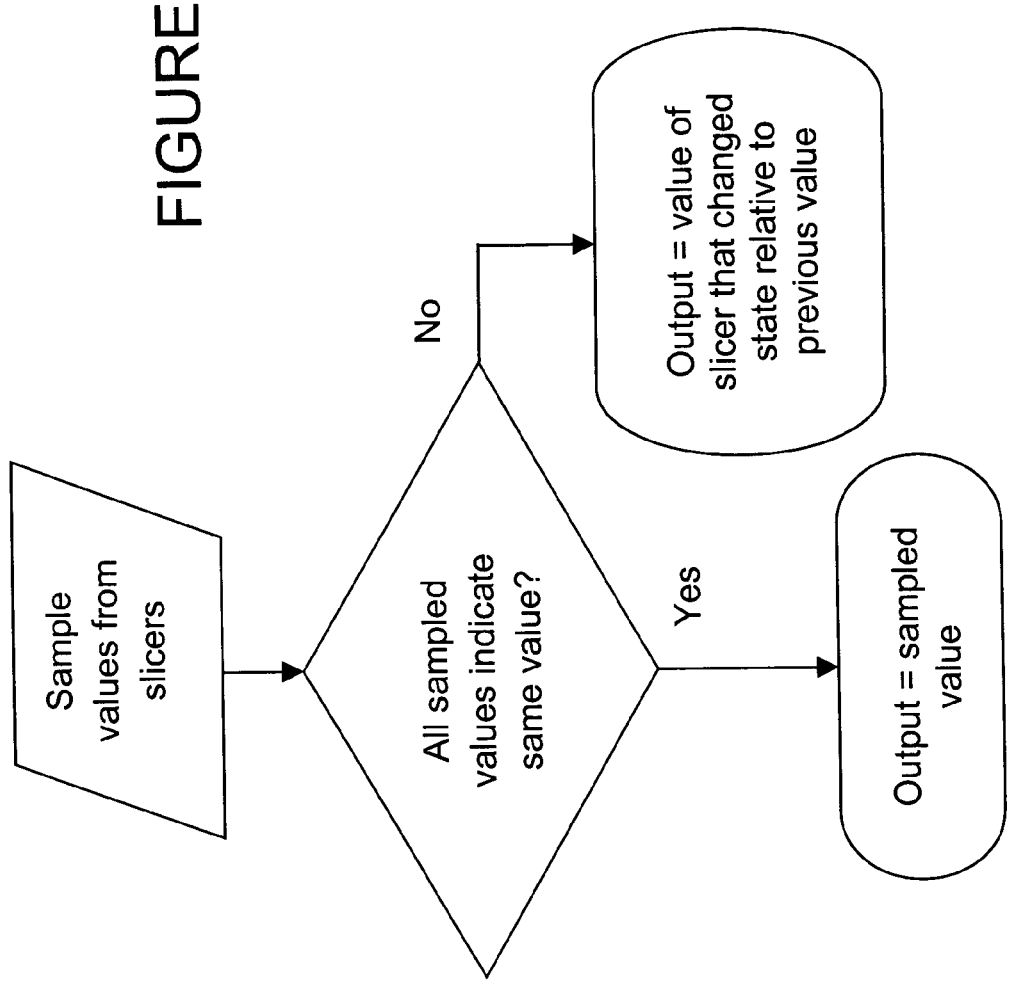

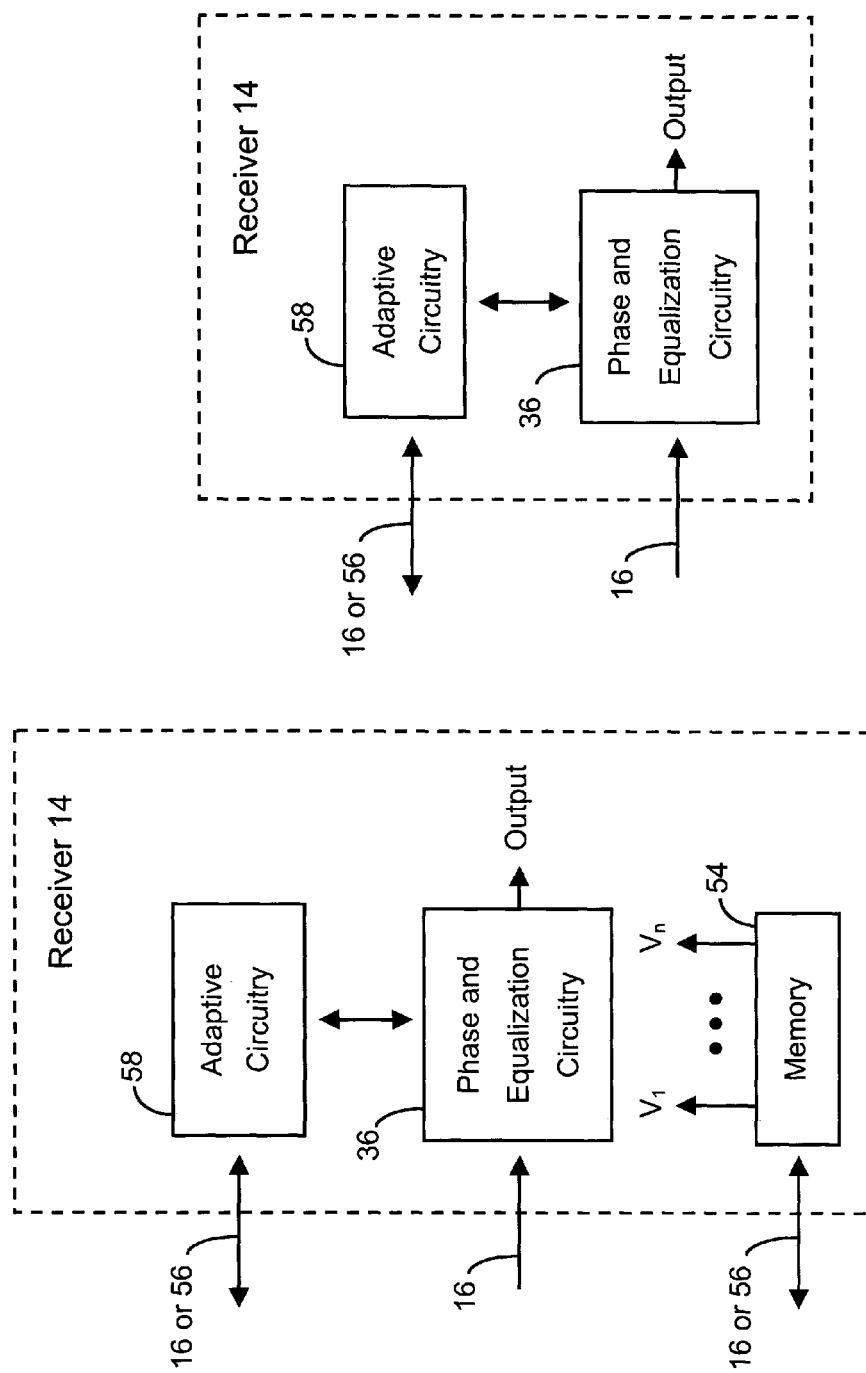

RECEIVER BASED DECISION FEEDBACK EQUALIZATION CIRCUITRY AND TECHNIQUES

BACKGROUND OF THE INVENTION

This invention relates to systems and techniques that are used to enhance the performance of data communication systems; and more particularly, in one aspect, to enhance the performance of data communication systems (for example, communication systems implemented in wired type environments such as microstrip, stripline, printed circuit board (e.g., a backplane) and cable using receiver based equalization.

Communications systems are continuing to increase the rate at which data is transmitted between devices. The increase in data rate presents a challenge to maintain, enhance or optimize the ability to recover the transmitted signal and thereby the information contained therein. In general, increasing the rate of transfer of data tends to adversely impact the fidelity of the communications.

A technique to address that impact on the communications is to employ equalization circuitry in, for example, the transmitter, receiver, or both the transmitter and receiver. Such circuitry typically "compensates" for the intersymbol interference (ISI) introduced by transmission channel artifacts as well as by modulation, pulse shaping and receiver based circuitry in the communications path. Where the equalization circuitry is implemented in the receiver, it often takes the form of a decision feedback equalization.

Decision feedback equalization employs, among other things, "historical" data samples to compensate for ISI. In this regard, with reference to FIG. 1, in general, typical decision feedback equalization circuitry, after sampling data using a slicer or amplifier and making a decision on the value of the sample, applies the decision to a series of delay stages, each stage having an output that is weighted and summed with the other stages (See, for example, U.S. Pat. No. 4,583,234). The sum is added to the then incoming data. The number of delay stages dictates the amount of "historical" or previous data samples that are incorporated into the feedback to compensate for ISI.

There are many types or implementations of decision feedback equalization. (See, for example, U.S. Pat. Nos. 6,249,544 and 6,252,904, and U.S. patent application Publications 2002/0172276 and 2003/0016770). Conventional decision feedback equalization circuitry is typically quite complicated to implement as well as computationally intensive. As such, the implementation of conventional decision feedback equalization is often difficult and expensive.

There is a need for a system and technique to overcome the shortcomings of one, some or all of the conventional systems, decision feedback equalization circuitry and techniques implementing receiver based equalization circuitry. In this regard, there is a need for an improved decision based equalization circuitry to "compensate" for the intersymbol interference that is less complicated and expensive than conventional circuitry and techniques.

SUMMARY OF THE INVENTION

There are many inventions described and illustrated herein. In a first principal aspect, the present invention is an equalization circuit to receive a plurality of input symbols and to generate an output signal wherein the output signal is representative of a transmitted symbol. The equalization circuit includes a first data slicer having a first input that is adapted to receive the plurality of input symbols and a second input that is adapted to receive a first slicer level. The first data slicer outputs a first or second value based on the amplitude of the input symbol relative to the first slicer level. The equalization circuit also includes a second data slicer having a first input to receive the plurality of input symbols and a second input adapted to receive a second slicer level. The second data slicer outputs the first or second value based on the amplitude of the input symbol relative to the second slicer level.

The equalization circuit further includes logic circuitry, coupled to the first and second data slicers, to output a signal having either a first or second logic level wherein if the data slicers output the same value, the logic circuitry outputs the logic level that is associated with the value output by the data slicers; and if the data slicers output different values, the logic circuitry outputs the complement of the logic level of the immediately preceding input symbol.

In one embodiment, the first and second data slicers each include at least one voltage comparator. In another embodiment, the first and second data slicers each include a plurality of serially coupled sense amplifiers.

The equalization circuit may also include adaptive circuitry, coupled to the first data slicer, to determine the first slicer level during operation of the equalization circuit and to provide the first slicer level to the first data slicer.

In another principal aspect, the present invention is a receiver to receive a plurality of input symbols transmitted by a transmitter, and to generate an output signal that is representative of each transmitted symbol. The receiver includes equalization circuitry having a first data slicer and a second data slicer. The first data slicer includes a first input that receives the plurality of input symbols and a second input that receives a first slicer level. The first data slicer outputs a first or second value based on the amplitude of the input symbol relative to the first slicer level.

The second data slicer includes a first input to receive the plurality of input symbols and a second input adapted to receive a second slicer level. The second data slicer outputs the first or second value based on the amplitude of the input symbol relative to the second slicer level.

The equalization circuitry further includes logic circuitry, coupled to the first and second data slicers, to output a signal having either a first or second logic level wherein if the data slicers output the same value, the logic circuitry outputs the logic level that is associated with the value output by the data slicers; and if the data slicers output different values, the logic circuitry outputs the complement of the logic level of the immediately preceding input symbol.

The receiver of this aspect of the invention also includes memory, coupled to the second input of each data slicers. The memory stores information which is representative of the first and second slicer levels.

In one embodiment, the receiver may include adaptive circuitry, coupled to the second input of each data slicers, to adjust the first and/or second slicer levels in accordance with the performance of the receiver or to change the first and/or second data slicer level based on an upper edge and a lower edge of a receive eye of the first and/or second data slicer. Margining circuitry may be employed to determine the upper inner edge and the lower inner edge of the receive eye of the first and/or second data slicer.

In one embodiment, the margining circuitry includes a margining slicer having a first input adapted to receive the plurality of input symbols and a second input adapted to receive a margining slicer level. The margining slicer outputs a first or second value based on the amplitude of the input symbol relative to the margining slicer level.

The margining circuitry may also include reference level adjustment circuitry to generate the margining slicer level. In one embodiment, the reference level adjustment circuitry generates margining slicer levels that vary according to a margining algorithm.

The receiver may also include phase detection circuitry including first and second phase slicers. Each phase slicer includes a plurality of inputs, wherein a first input of each phase slicer is adapted to receive the plurality of input symbols. A second input of the first phase slicer is adapted to receive a first slicer level, wherein the first data slicer outputs a first or second value based on the amplitude of the input symbol relative to the first slicer level. A second input of the second phase slicer is adapted to receive a second slicer level, wherein the second data slicer outputs the first or second value based on the amplitude of the input symbol relative to the second slicer level.

Margining circuitry may be employed to measure the value of an error signal of a phase sampling point. Adaptive circuitry, which is coupled to margining circuitry and the second input of the first slicer, may change the first slicer level based on the value of the error signal.

As mentioned above, the margining circuitry may include a margining slicer having a first input adapted to receive the plurality of input symbols and a second input adapted to receive a margining slicer level. The margining slicer outputs a first or second value based on the amplitude of the input symbol relative to the margining slicer level.

BRIEF DESCRIPTION OF THE DRAWINGS

In the course of the detailed description to follow, reference will be made to the attached drawings. These drawings show different aspects of the present invention and, where appropriate, reference numerals illustrating like structures, components, materials and/or elements in different figures are labeled similarly. It is understood that various combinations of the structures, components, materials and/or elements, other than those specifically shown, are contemplated and are within the scope of the present invention.

FIGS. 5A-5D illustrate flowcharts of exemplary processes performed by the logic circuitry (and logic) of FIGS. 3A, 4A, 4B, 9A, 9B and 10 (and other embodiments described and illustrated herein);

FIGS. 6A-6F illustrate techniques and circuitry to provide reference or slicer level information to the decision feedback equalization circuitry of FIGS. 3A, 4A, 4B, 9A, 9B and 10, according to various aspects of the present invention;

DETAILED DESCRIPTION

Figure 1:
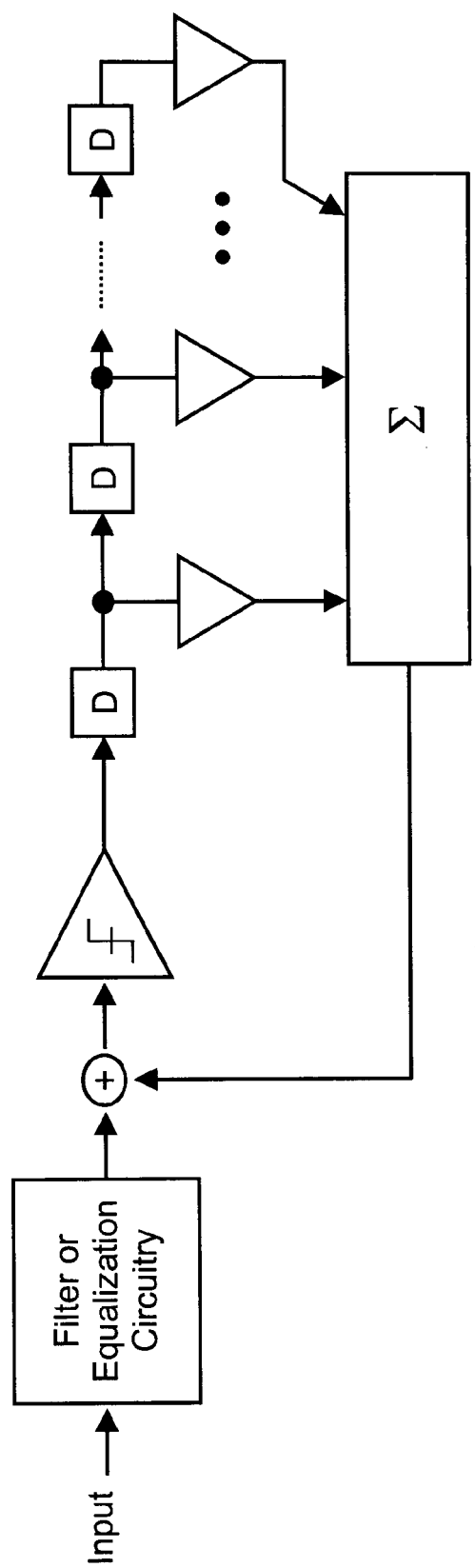
FIG. 1 is a block diagram representation of a prior art decision feedback equalization topology.

There are many inventions described and illustrated herein. In one aspect, the present invention is directed to a technique of, and circuitry and system for enhancing the performance of data communication systems using receiver based decision feedback equalization circuitry. In one embodiment, the equalization circuitry and technique employs a plurality of data slicers (for example, a set of two) to receive an analog input and output a binary value based on a reference or slicer level and a plurality of phase slicers (for example, a set of three) sampling a half symbol interval offset in time from the data slicers for timing recovery. The output of the data slicers is provided to logic circuitry to determine whether the analog input was a binary or logic high or binary or logic low. In those instances where the data slicers "agree" and both indicate either a high or a low, the logic circuitry outputs the corresponding binary value. In those instances where the data slicers do not "agree"—that is, where one data slicer indicates the input to be a binary or logic high value and the other data slicer indicates the input to be a binary or logic low value, in one embodiment, the logic circuitry outputs the complement of the previous value or state. In another embodiment, the logic circuitry selects the output or state of that slicer that changed the state of its output from the previous sample or output. In yet another embodiment, the logic circuitry selects the decision of the data slicer with higher slicer level if the previous logic value or state was "high", or selects the decision of the data slicer with the lower slicer level if the previous logic value or state was "low".

In one embodiment, the outputs of the plurality of phase slicers and the binary decisions (output of the data decision logic circuitry) are provided to phase decision logic circuitry where they are used to determine whether the sampling time needs to be advanced, delayed or modified with respect to the next nominal sampling instance. The data decisions are used to determine if the input signal should be "passing"

through one of the phase slicer reference levels. If the data decisions indicate that the input signal is to be "passing" through a slicer level with a negative (positive) slope and the phase slicer output is positive (negative) then the sampling time is late. If the data decisions indicate that the input signal is to be "passing" through a slicer level with a negative (positive) slope and the phase slicer output is negative (positive) then the sampling time is early.

In one embodiment, the reference values or slicer levels of two phase slicers are set to the same values or levels as the two data slicer reference levels. A third phase slicer has a reference value or level of zero (or substantially zero). In another embodiment, the reference values or slicer levels of two phase slicers are set to the same as the two data slicer reference levels. The reference level of a third phase slicer is set to halfway (or substantially halfway) between the values or levels of the other phase slicers.

In yet another embodiment, reference levels or values of two phase slicers are set to be proportional to the reference levels of the data slicers and a third phase slicer has a reference level of halfway between those levels or values. Indeed, in another embodiment, the reference levels or values of two phase slicers are set to be proportional to the data slicer reference levels or values and a third phase slicer has a reference level set to zero (or substantially zero). Two phase slicers may also have their reference values set with a known offset from the data slicer reference levels and a third phase slicer has a reference level of halfway between the reference levels of the two phase slicers.

Moreover, in another embodiment, the reference levels of two phase slicers may be set with a known or predetermined offset from the reference levels of the two data slicer. A third phase slicer may have a reference level of zero or substantially zero.

In one embodiment, the output of the phase slicer with the most positive reference level is considered "valid" if the two previous data decisions were logic state high ('1') and the following data decision is a logic state low ('0'). In this embodiment, the output of the phase slicer with the most negative reference level is considered "valid" if the two previous data decisions were logic state low ('0') and the following data decision is a logic state high ('1'). Finally, the output of the phase slicer with the zero reference level is considered "valid" if (i) the three previous data decisions were logic state high, low, high and the following data decision is a logic state low or (ii) the three previous data decisions were logic state low, high, low and the following data decision is a logic state high.

The reference or slicer levels of the data and/or phase slicers may be predetermined based on, for example, user defined data (for example, empirical data of the optimum, enhanced or desired operating conditions). Those slicer levels may be hardwired to a particular value or stored in memory that is permanent, semi-permanent, or programmable (for example, programmed before, during or after initialization or power-up). Thus, in one set of embodiments, one or more reference or slicer level(s) may be pre-programmed or pre-set, for example, by permanently, semi-permanently or temporarily (i.e., until re-programmed) storing information which is representative of the slicer level(s).

The information which is representative of the reference or slicer level(s) may be stored or in, for example an SRAM, DRAM, ROM, PROM or EEPROM or the like (for example, configuring the state of a certain pin or pins on the package) in or on the receiver. In this way, the equalization circuitry may access the memory to retrieve the necessary information during start-up/power-up, initialization or re-initialization. The memory used to store the information representative of the slicer level(s) may be comprised of discrete component(s) or may reside on the integrated circuit upon which the receiver or transceiver resides.

In another embodiment, information representative of the reference or slicer level(s) may be provided to the equalization circuitry by an operator and/or external device during system operation or at start-up/power-up, initialization or re-initialization. In this embodiment, an adjustment or control of the slicer level(s) by the equalization circuitry may be by the operator or an external device via programming either before or during normal operation of the receiver and/or system. For example, an operator may provide information which is representative of the slicer level(s) in order to change, enhance and/or optimize the performance of the receiver and/or system. This information may be the actual slicer level(s) or adjustments, modifications and/or changes to be made to the slicer level(s) (i.e., relative information). Such information may be provided directly to the receiver (to be implemented within the equalization circuitry) or to a controller to distribute to the receiver and/or set of receivers. In this way, the receiver may employ the slicer levels when determining whether an input is binary or logic high or binary or logic low and for determining the phase information.

In yet another embodiment, the reference or slicer levels may be determined using an adaptive process that determines an appropriate, enhanced, optimum and/or superior slicer level based on predetermined criteria or criterion regarding the operating characteristics of the system, transmitter and/or receiver. In this regard, the reference or slicer levels may be adjusted, set and/or controlled during operation of the receiver and/or system. The adjustment, setting and/or control of the slicer level(s) for the equalization circuitry may be accomplished using an adaptive algorithm maintained in, for example, the receiver.

In one embodiment, the reference or slicer levels of the data and phase slicers are moved, adjusted or changed together such that the reference levels are "ganged". In another embodiment, the levels of the data and phase slicers are not "ganged" but may be independently moved, adjusted or changed such that a change of the reference level of the data slicers does not change the reference level of the phase slicers (and vice versa).

In another embodiment, the circuitry and system of the present invention may employ any combination of the aforementioned techniques for determining and/or employing the slicer level(s). For example, the pre-set or preprogrammed slicer level(s) may be fine-tuned to enhance the system performance. In this regard, after (or during) the performance of an initialization or re-initialization process, the system may implement fine adjustments to the slicer level(s). The fine adjustments may be accomplished or implemented by the operator, an external device and/or an adaptive circuitry (in, for example, the receiver) implementing an adaptive algorithm. Indeed, all techniques for determining the slicer level(s), whether now known or later developed, are intended to be within the scope of the present invention. In this way, implementation of an appropriate, optimum and/or enhanced slicer level more rapidly and/or a less complex adaptive algorithm may be employed.

As mentioned above, the information which is representative of the slicer level(s) may be the actual values of the slicer level(s) or, alternatively, the information may be adjustments, modifications and/or changes to be made to the slicer level(s).

Figure 2A:
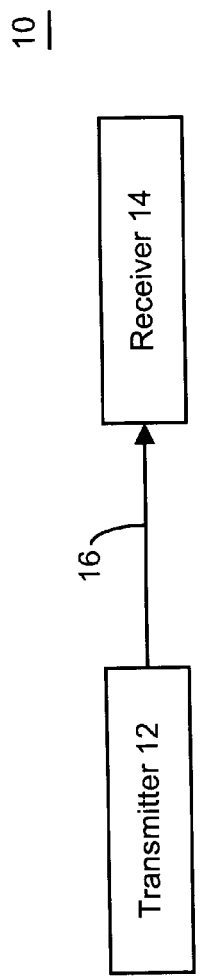
FIG. 2A is a block diagram representation of an exemplary communications system including a transmitter and a receiver.

With reference to FIG. 2, in one aspect, the present invention may be implemented in a high-speed digital communication system 10 including transmitter 12 and receiver 14 (having decision feedback equalization circuitry). Briefly, transmitter 12 is connected to receiver 14 via communications channel 16, for example, a backplane. In one embodiment, transmitter 12 encodes and transforms a digital representation of the data into electrical signals. The transmitter 12 also transmits the signals to receiver 14. The received signals, which may be distorted with respect to the signals transmitted into or onto communications channel 16 by transmitter 12, are processed and decoded by receiver 14 to reconstruct a digital representation of the transmitted information.

Figure 2B:
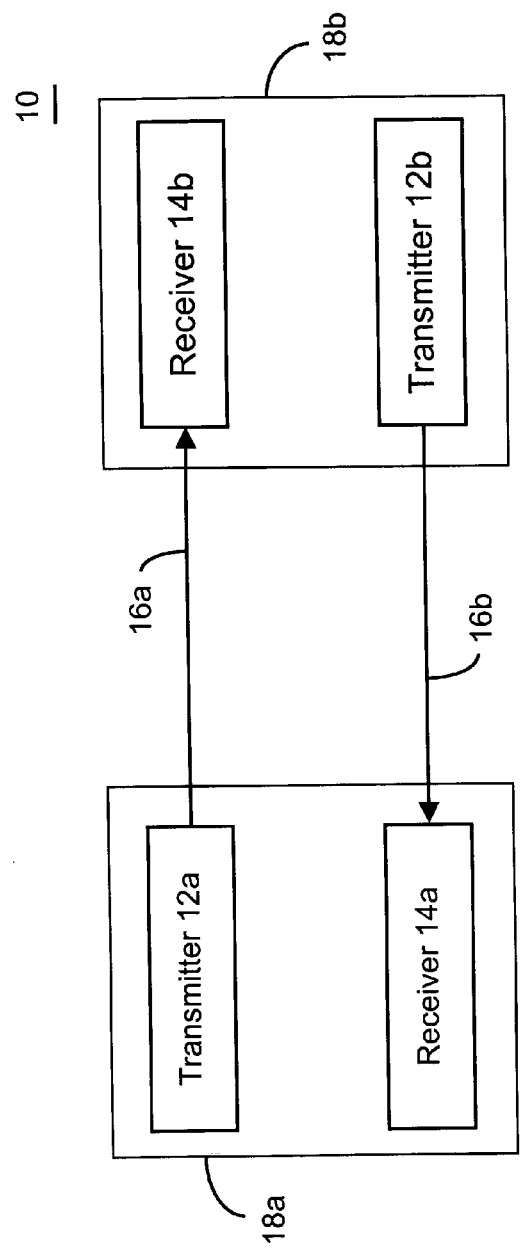
FIG. 2B is a block diagram representation of transmitter/receiver pairs of an exemplary communications system.

With reference to FIG. 2B, communication system 10 typically includes a plurality of transmitters and receivers. In this regard, communications system 10 includes a plurality of unidirectional transmitter and receiver pairs (transmitter 12a and receiver 14b; and transmitter 12b and receiver 14a). Transmitter 12a and receiver 14a may be incorporated into transceiver 18a (in the form of an integrated circuit). Similarly, transmitter 12b and receiver 14b are incorporated into transceiver 18b. From a system level perspective, there are a plurality of such transmitter/receiver pairs in simultaneous operation, for example, four, five, eight or ten transmitter/receiver pairs, communicating across communications channel 16. Thus, in operation, the transmitter and receiver pairs simultaneously transmit data across channel 16.

In one embodiment, transmitters 12 and receivers 14 employ a binary communications technique (i.e., pulse amplitude modulated (PAM-2) communications technique). Accordingly, each transmitter/receiver pair may operate in the same manner to send one bit of data for each symbol transmitted through communications channel 16. Although certain aspects of the present invention are described in the context of PAM-2 signaling techniques, the present invention may utilize other modulation formats that encode more bits per symbol. Moreover, other communications mechanisms that use encoding techniques including, for example, four levels, or use other modulation mechanisms may also be used, for example, PAM-5, PAM-8, PAM-16, CAP, and wavelet modulation. In this regard, the techniques described herein are in fact applicable to any and all modulation schemes, including but not limited to, PAM-2 encoding described herein.

Figure 3A:
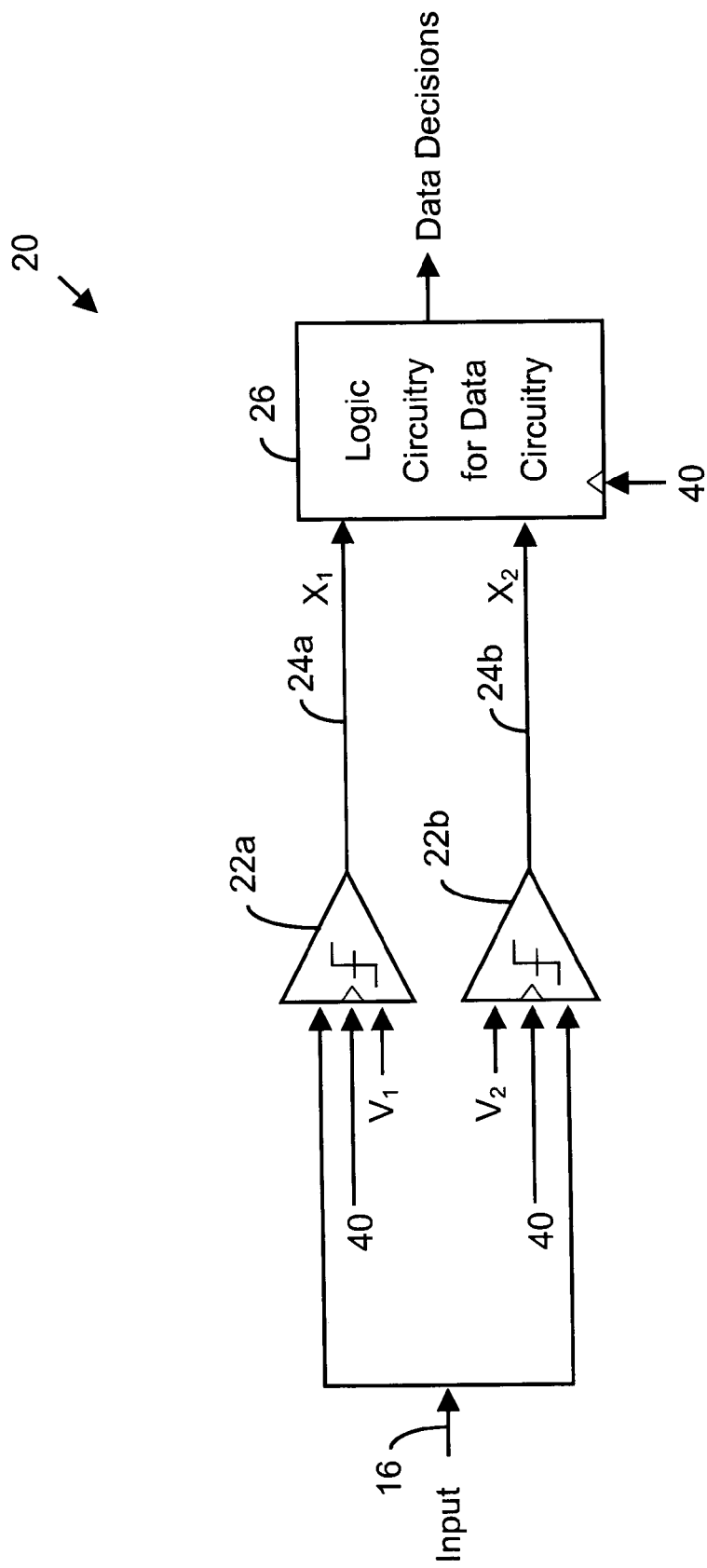
FIG. 3A is a block diagram representation of a decision feedback equalization topology, including two slicers and data samples ($X_1$ and $X_2$), according to one aspect of the present invention.

With reference to FIG. 3A, in one embodiment, decision feedback equalization circuitry 20 of the present invention includes data slicers 22a and 22b (having outputs 24a and 24b, respectively) and logic circuitry 26. The data slicers 22a and 22b receive the input data signal from communications channel 16 and, based on the reference or slicer levels $V_1$ and $V_2$, respectively, output either a first state (for example, binary high) or a second state (for example, binary low). In this regard, data slicers 22a and 22b compare their slicer levels ($V_1$ and $V_2$) to the input data signal and, if the input data is above their slicer levels, the data slicers 22a and 22b output a first state (for example, binary or logic high). However, if the input data is below their slicer levels, the data slicers 22a and 22b output a second state (for example, binary or logic low).

In one embodiment, data slicers 22a and 22b may each be a high performance comparator-amplifier. The high performance comparator-amplifier may comprise one or more cascaded high performance sense amplifiers. As such, when the input data (from communications channel 16) is above the slicer (comparator) levels, the one or more high performance sense amplifiers compare (sequentially when data slicers 22a and 22b comprise cascaded high performance sense amplifiers) their slicer levels ($V_1$ and $V_2$, respectively) to the input data, and output a first state. When, as mentioned above, the input data applied to data slicers 22a and 22b is below the slicer levels ($V_1$ and $V_2$, respectively), the one or more high performance sense amplifiers of data slicers 22a and 22b output a second state.

Each output 24a and 24b of data slicers 22a and 22b, respectively, is provided to logic circuitry 26. The logic circuitry 26 is employed to determine from the data slicer outputs 24a and 24b whether a given data input is a first state (for example, binary or logic high) or second state (binary or logic low). The logic circuitry 26 employs a decision feedback technique to determine the state of a given data input sampled by data slicers 22a and 22b on communications channel 16.

Figure 3B:
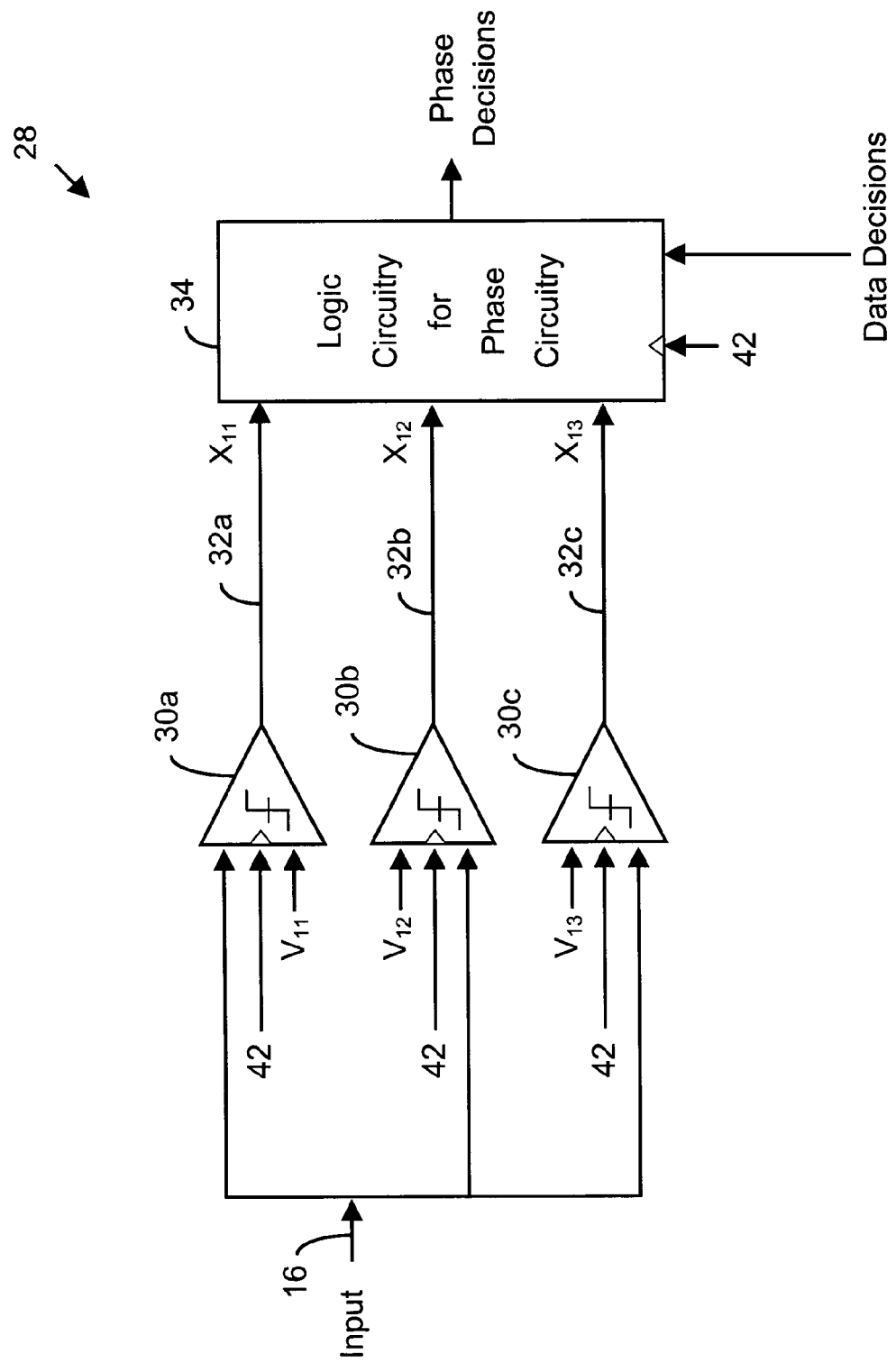
FIG. 3B is a block diagram representation of a phase detection circuitry, including three slicers and phase samples ($X_{11}$, $X_{12}$ and $X_{13}$), according to one aspect of the present invention.

With reference to FIG. 3B, in one embodiment, phase detection circuitry 28 of the present invention may include phase slicers 30a-c (having outputs 32a-c, respectively) and logic circuitry 34. The phase slicers 30a-c receive the input data signal from communications channel 16 and, based on the reference or slicer levels $V_{11}$, $V_{12}$ and $V_{13}$, respectively, output either a first state (for example, binary high) or a second state (for example, binary low). In this regard, data slicers 30a-c compare the slicer level ($V_{11}$, $V_{12}$ and $V_{13}$, respectively) to the input data signal and, if the input data at the phase sampling instance is above the respective slicer level, phase slicers 30a-c output a first state (for example, binary or logic high). However, if the input data is below the respective slicer level, phase slicers 30a-c output a second state (for example, binary or logic low).

In one embodiment, phase slicers 30a-c may each be a high performance comparator-amplifier. The high performance comparator-amplifier may comprise one or more cascaded high performance sense amplifiers. As such, when the input data (from communications channel 16) is above the slicer (comparator) levels, the one or more high performance sense amplifiers compare (sequentially when phase slicers 30a-c comprise cascaded high performance sense amplifiers) the slicer level ($V_{11}$, $V_{12}$ and $V_{13}$, respectively) to the input data, and output a first state. When, as mentioned above, the input data applied to phase slicers 30a-c is below the slicer level ($V_{11}$, $V_{12}$ and $V_{13}$, respectively), the one or more high performance sense amplifiers of phase slicers 30a-c output a second state.

Figure 3C:
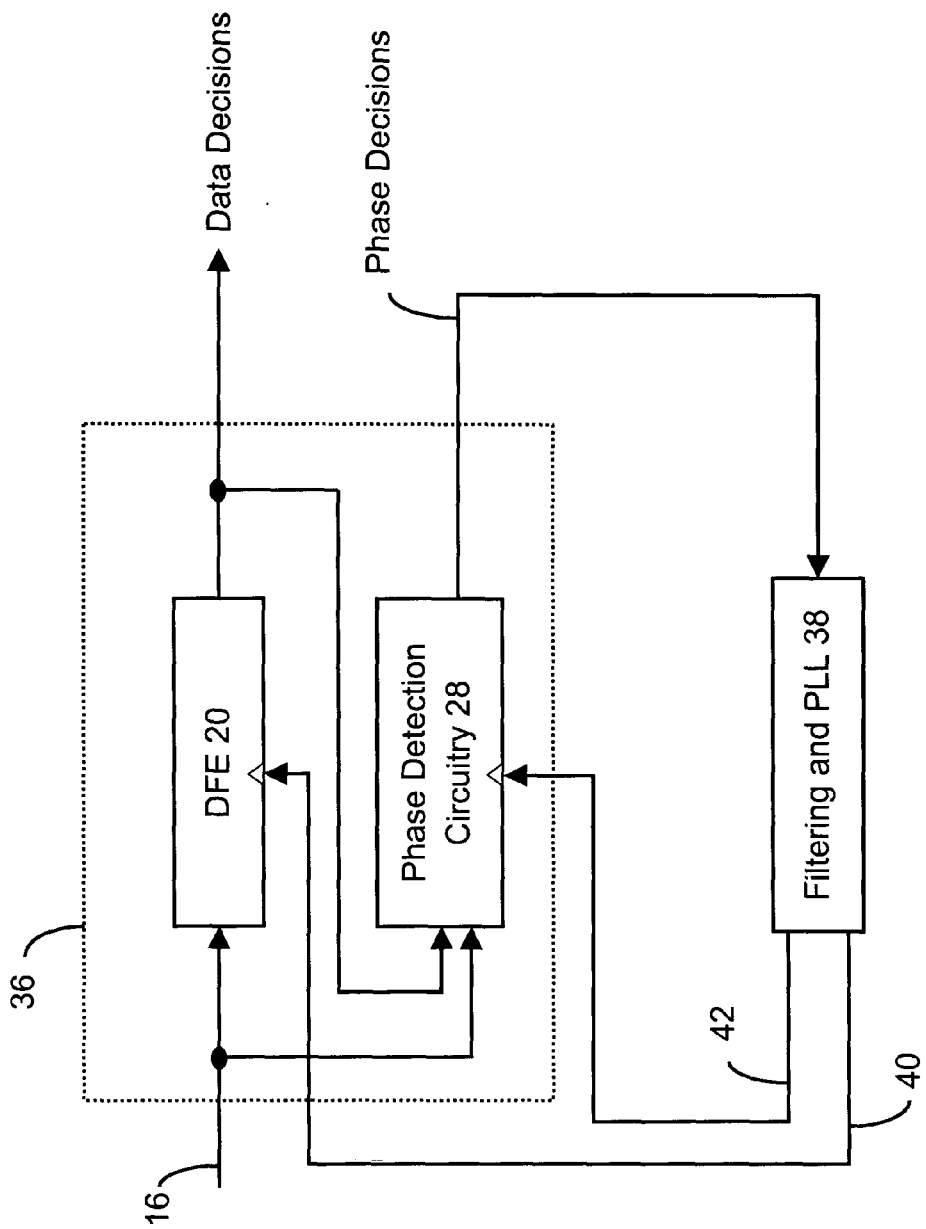
FIG. 3C is a block diagram representation of an overview of one embodiment of a phase detection, decision feedback and clock alignment topology, including the phase detection and decision feedback circuitry, according to an aspect of the present invention.

With reference to FIG. 3C, in one embodiment, both input data signal 16 and the output of decision feedback equalization circuitry 20 are applied to phase detection circuitry 28. The phase detection circuitry 28 output (early/late decisions) forms an input to a filtering and PLL circuitry 38 that generates the clocks 40 and 42 for decision feedback circuitry 20 and phase detection circuitry 28 (i.e., phase detection and decision feedback equalization circuitry 36). The clocks 40 and 42 provide edges at the symbol rate. Further, clocks 40 and 42 are offset from one and other by half of a symbol interval.

Figure 4B:
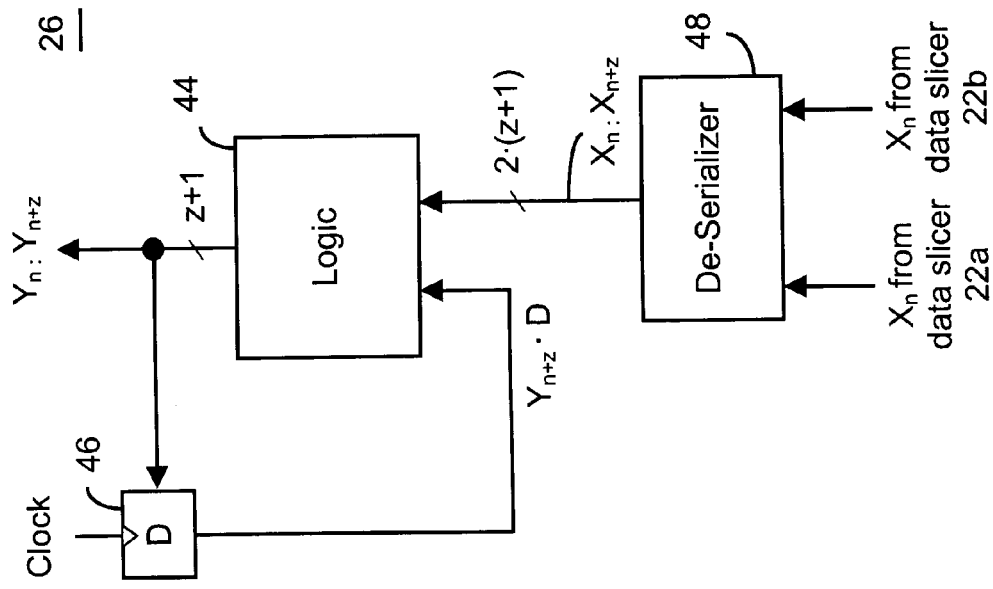
FIGS. 4A-4C are block diagram representations of the logic circuitry, illustrated in FIGS. 3A, 9A, 9B and 10 according to various aspects of the present invention.
Figure 4A:
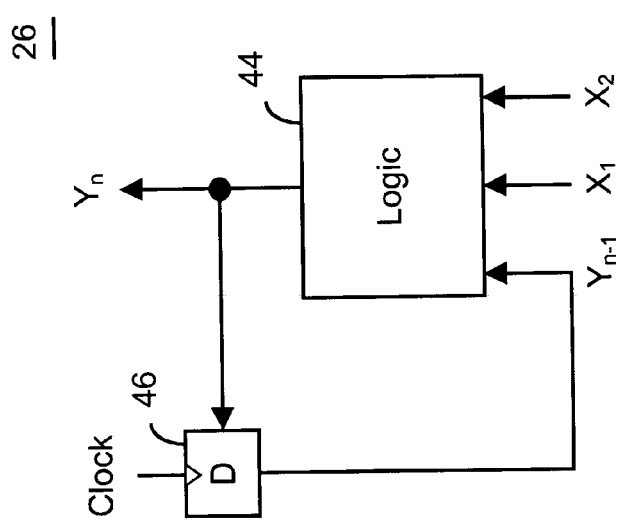

With reference to FIG. 4A, in one embodiment, logic circuitry 26 includes logic 44 and delay circuitry 46. The logic 44 determines whether a delayed version of the outputs of the data slicers 22a and 22b (i.e., $X_1$ and $X_2$) indicate the same value for the associated analog input data (i.e., "agree"), for example, both samples $X_1$ and $X_2$ indicate a first state (for example, binary or logic high) or a second state (for example, binary or logic low). In those instances where data slicers 22a and 22b "agree" and both indicate a first state or a second state, logic 44 outputs the corresponding binary value, $Y_n$.

However, in those instances where the slicers do not "agree"—that is, where one data slicer indicates the input data to be a binary high value and another slicer indicates the input data to be a binary low value, in one embodiment, the logic 44 outputs the complement of the previous binary value (i.e., $Y_n$=complement of $(Y_{n-1})$). In this regard, delay circuitry 46 provides logic 44 with the state of the previous binary value, $Y_{n-1}$. The logic 44 employs the previous binary value, $Y_{n-1}$ to determine and output the state of the current data input. FIG. 5A illustrates a flowchart of the decision processes of logic 44 in accordance with this embodiment.

In another embodiment, where logic 44 determines one of the slicers 22a or 22b indicates the input data to be a first state (for example, a binary or logic high value) and another slicer indicates the analog input data to be a second state (for example, a binary or logic low value), logic 44 selects the output from that slicer that has "changed" its output value from the output value representative of the previous input data. FIG. 5B illustrates a flowchart of the decision processes of logic 44 in accordance with this embodiment.

Figure 5C:
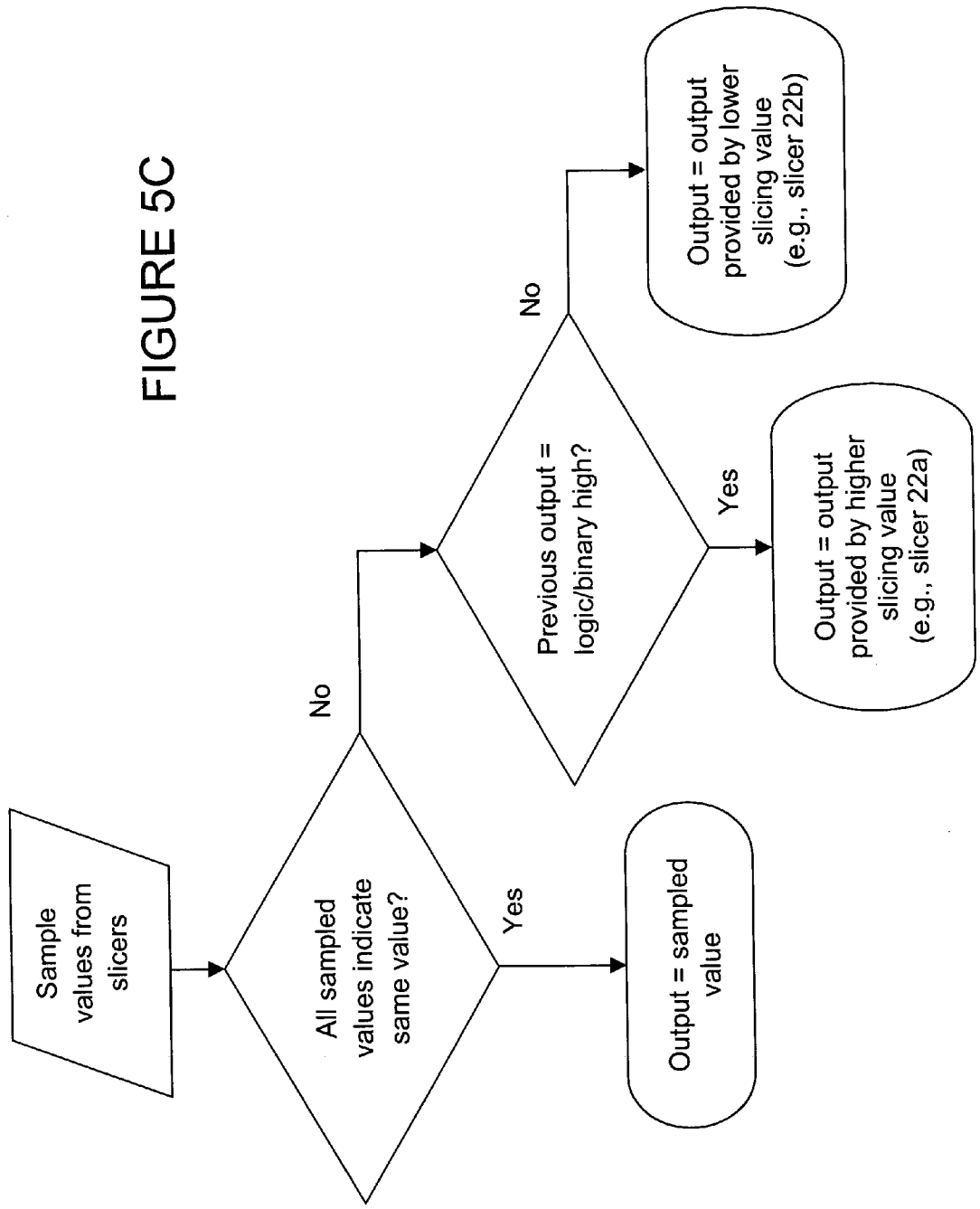

In one embodiment, where logic 44 determines that slicers 22a and 22b do not "agree" (that is, provide differing values for the same analog input data), if the previous value of the analog input was determined to be a "high", for example, then logic 44 selects or employs the "decision", value or output (for example, $X_1$ or $X_2$) provided with the higher slicer value or slicer level ($V_1$ or $V_2$) to determine the present or current binary value. In this regard, logic 44 selects the output ($X_1$ or $X_2$) of data slicer 22a and 22b having or comparing the higher slicer value or slicer level ($V_1$ or $V_2$) as the value for the present or current input data. In contrast, where logic 44 determines that the previous analog input was a binary value "low", logic 44 selects the "decision" or output provided by data slicer 22a and 22b having or comparing the lower slicer value or slicer level ($V_1$ or $V_2$) as the value for the present or current input data. FIG. 5C illustrates an exemplary flowchart of the decision processes of logic 44 in accordance with this embodiment.

Figure 5D:
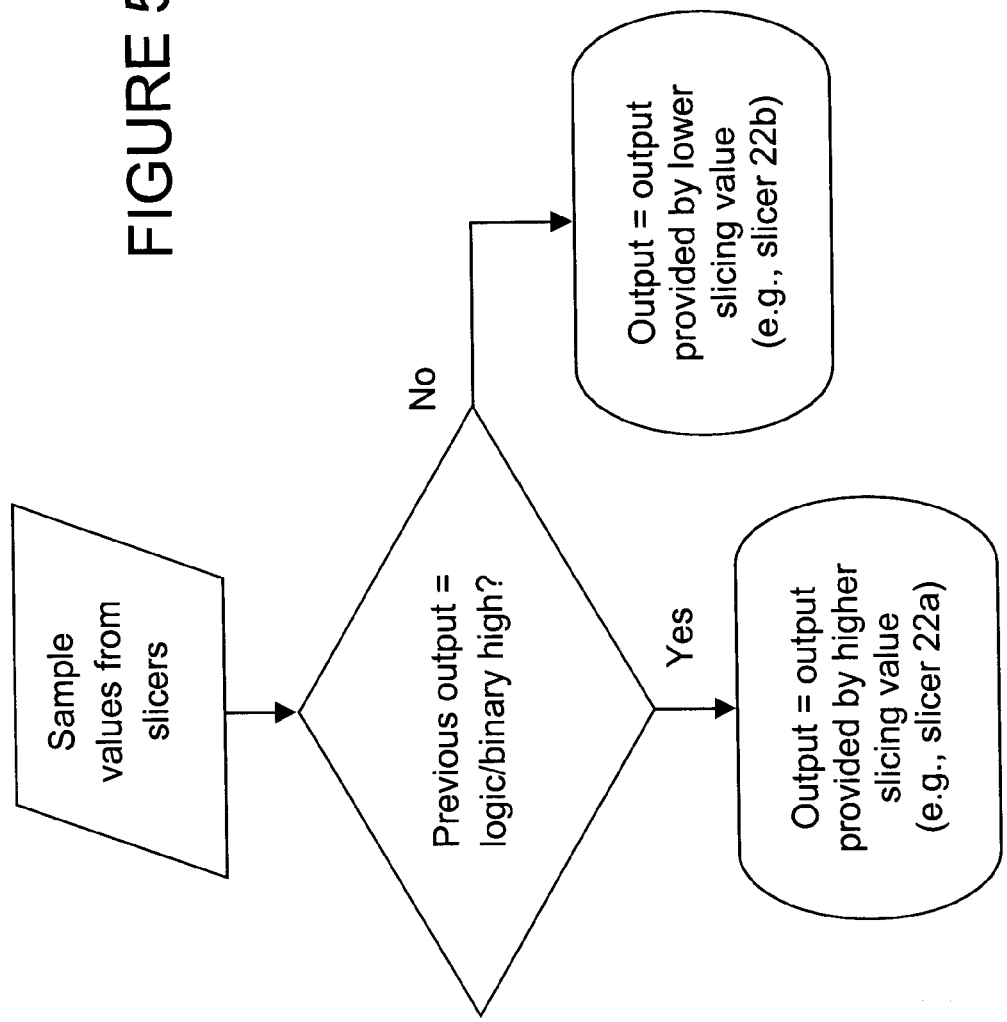

In yet another embodiment, logic 44 does not initially determine whether the outputs 24a and 24b of slicers 22a and 22b, respectively, agree; rather, where the previous value of the analog input was a logic "high", for example, logic 44 selects or employs the "decision", value or output (for example, $X_1$ or $X_2$) provided with the higher slicer value or slicer level ($V_1$ or $V_2$) to determine the present or current binary value. In this regard, logic 44 selects the output ($X_1$ or $X_2$) of data slicer 22a and 22b employing or comparing the higher slicer value or slicer level ($V_1$ or $V_2$) as the value for the present or current input data. In contrast, where logic 44 determines that the previous analog input was a binary value "low", logic 44 selects the "decision", value or output provided by data slicer 22a and 22b employing or comparing the lower slicer value or level ($V_1$ or $V_2$) as the value for the present or current input data. FIG. 5D illustrates an exemplary flowchart of the decision processes of logic 44 in accordance with this embodiment.

It should be noted that the clock frequency of the processes or functions performed by logic 44 may be reduced by employing the embodiment illustrated in FIG. 4B. In this regard, the frequency is reduced by a factor of "z" (for example, 8) by de-serializing each of the input values from data slicers 22a and 22b (via de-serializer 48). In this embodiment, the frequency of the clock may be significantly reduced to, for example, facilitate or simplify implementation of the circuitry to perform the operations of logic 44 or facilitate or simplify performance or execution of code employed by logic 44 in performing the aforementioned operations or functions.

It should be further noted that delay circuitry 46 may be one or more D-type flip/flop(s). In this regard, the D-type flip/flop(s) may be in the same clock domain as logic 44. Thus, the D-type flip/flop(s) may be clocked by the same clock employed for logic 44, a phase shifted version thereof, a clock having a multiple or fraction frequency of the clock employed for data slicers 22a and 22b, or a phase shifted version of a clock having a multiple or fraction frequency of the clock employed for data slicers 22a and 22b.

Figure 4C:
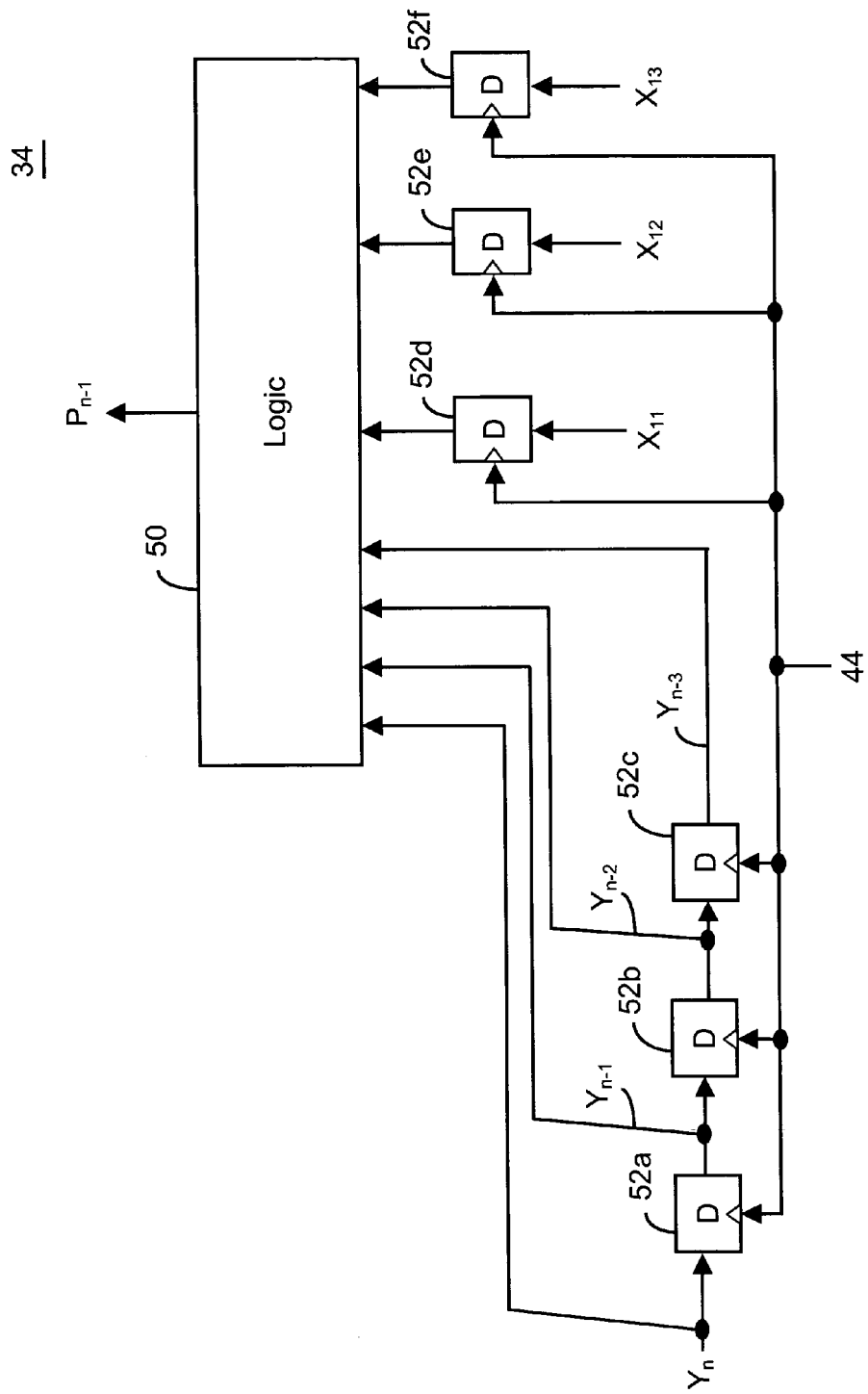

With reference to FIGS. 3B and 4C, in one embodiment, phase logic circuitry 34 includes logic 50 and delay circuitry 52a-f. The logic 50 uses the data decisions, $Y_n$ to $Y_{n-3}$, to determine whether one of the delayed versions of the outputs of phase slicers 30a-c (i.e., $X_{11}$, $X_{12}$ and $X_{13}$) has a "valid" data crossing and whether the "valid" phase sample indicates that the sampling instance was acceptable, too early or too late.

In particular, with continued reference to FIGS. 3B and 4C, each output 32a-c of phase slicer 30a-c, respectively, is provided to phase logic circuitry 34. The phase logic circuitry 34 employs the outputs of phase slicer 30a-c to determine whether the sampling instances are suitable, too early or too late. The phase logic circuitry 34 employs previous data decisions, in conjunction with the outputs of phase slicer outputs 30a-c, to determine if the present sample has timing information and, if the present sample includes timing information, to determine whether the present sample indicates the sampling instance is early or late.

In one embodiment, output 32a-c of phase slicer 30a-c, respectively, with the most "positive" reference level, for example, phase slicer 30a and output $X_{11}$, is only considered valid if the two previous data decisions ($Y_{n-1}$ and $Y_{n-2}$) were logic state high ('1') and the following data decision ($Y_n$) is a logic state low ('0'). If this condition is met and the sample $X_{11}$ is determined to be of the same state as $Y_{n-1}$ (i.e., a logic high ('1')), then the sampling instance is early. However, if this condition is met and the sample $X_{11}$ is determined to be of the same state as $Y_n$ (i.e., logic low ('0')), then the sampling instance is late.

The output 32a-c of phase slicer 30a-c (respectively) employing or comparing the most "negative" reference level, for example, phase slicer 30c and output $X_{13}$, is considered "valid" if the two previous data decisions, $Y_{n-1}$ and $Y_{n-2}$, were logic state low ('0') and the following data decision, $Y_n$, is a logic state high ('1'). If this condition is met and if sample $X_{13}$ is determined to be of the same state as $Y_{n-1}$ (i.e., a logic low ('0')), then the sampling instance is early. However, if this condition is met and the sample $X_{13}$ is determined to be of the same state as $Y_n$ (i.e., logic high ('1')), then the sampling instance is late.

Finally, in one embodiment, output 32a-c of phase slicer 30a-c employing or comparing the reference level between most positive and most negative reference levels, for example, phase slicer 30b and output $X_{12}$, is considered "valid" if the three previous data decisions, $Y_{n-1}$, $Y_{n-2}$, $Y_{n-3}$, were (i) logic states high, low, high and the data decision $Y_n$ is a logic state low, or (ii) the three previous data decisions, $Y_{n-1}$, $Y_{n-2}$, $Y_{n-3}$, were logic state low, high, low and the data decision $Y_n$ is a logic state high. If this condition is met and if sample $X_{12}$ is determined to be of the same state as $Y_{n-1}$, then the sampling instance is early. However, if this condition is met and if sample $X_{12}$ is determined to be of the same state as $Y_n$, then the sampling instance is late.

Figure 6B:
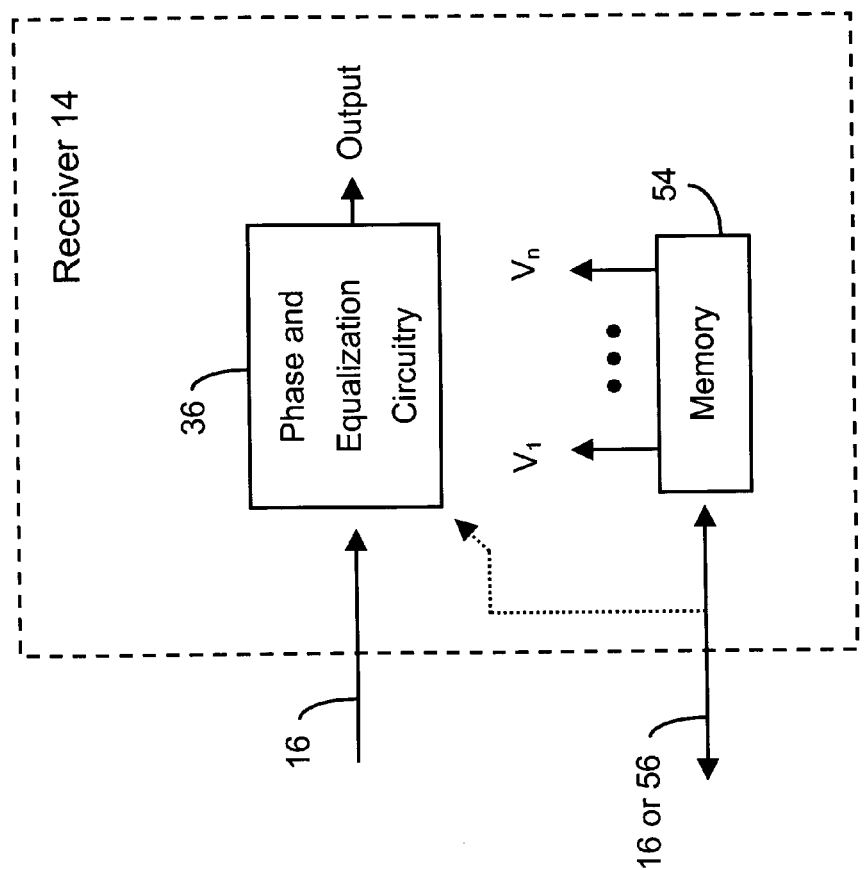
Figure 6A:
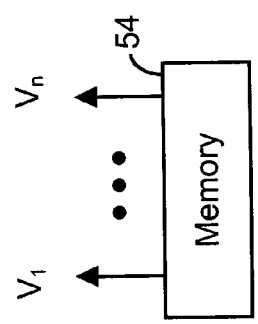
Figures 6E, 6F:
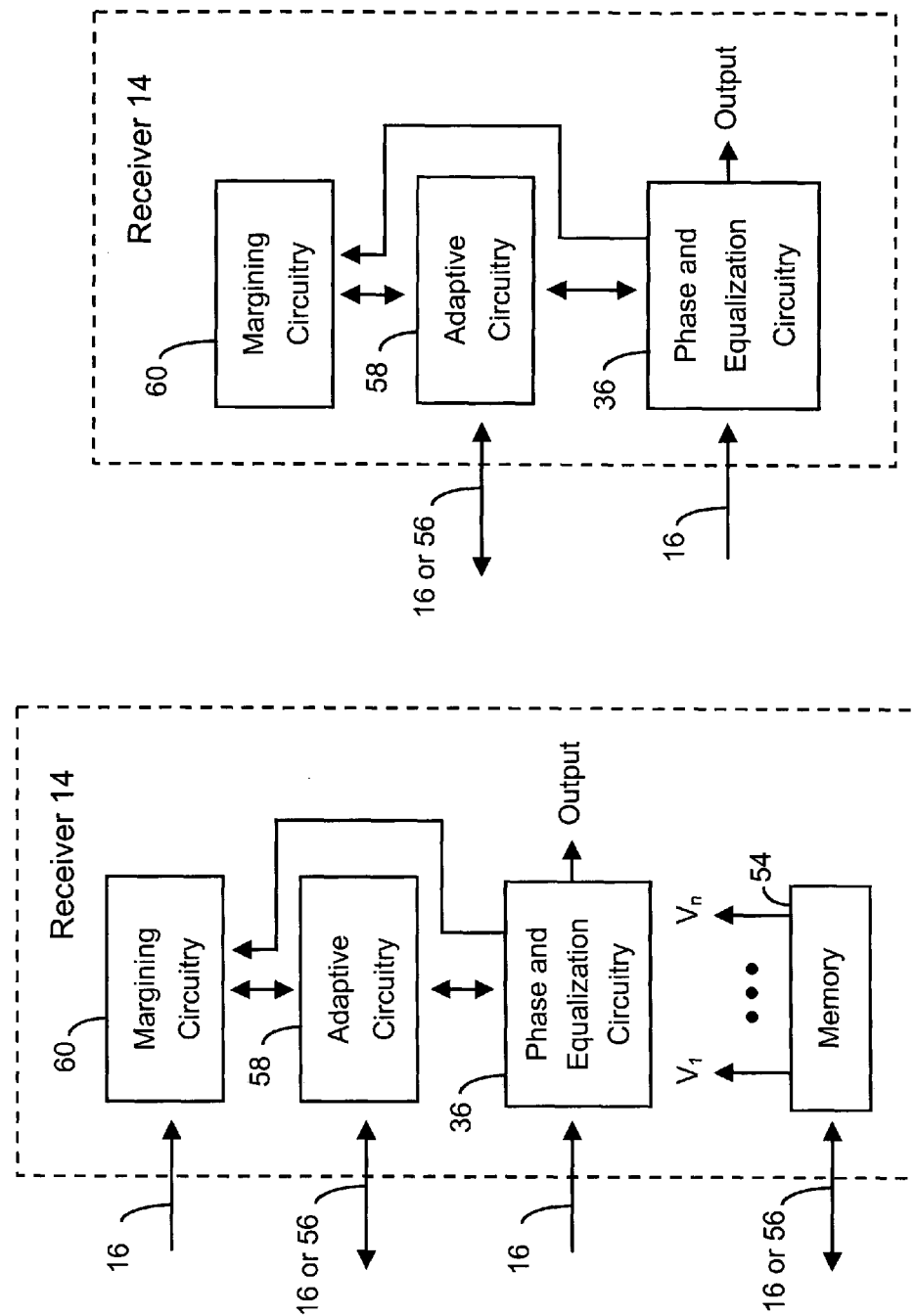

As mentioned above, each data slicer 22a and 22b compares the input data signal received on communications channel 16 to a reference or slicer level ($V_1$ and $V_2$) to determine or output a binary (or substantially binary) representation of the measured or received input data at the "data" sampling instances. Similarly, each phase slicer 30a-c compares the input data signal received on communications channel 16 to a reference or slicer level ($V_{11}$, $V_{12}$ and $V_{13}$) to determine or output a binary (or substantially binary) representation of the measured or received input data at the "phase" or "crossing" sampling instances. In one embodiment, the reference or slicer levels (i.e., the values upon which a comparison is made by data slicers 22a and 22b and phase slicers 30a-c) are predetermined based on, for example, user defined data (for example, empirical data of the optimum or enhanced operating conditions). The predetermined value(s) or level(s) may be pre-programmed or pre-set, for example, by permanently, semi-permanently or temporarily (i.e., until re-programmed) storing information which is representative of the slicer level(s). In this regard, the reference or slicer levels may be, for example, hardwired to a particular value or level or, as illustrated in FIGS. 6A and 6B, stored in memory 54 (for example, an SRAM, DRAM, ROM, PROM or EEPROM or the like) that is permanent, semi-permanent, or programmable (for example, programmed before, during or after initialization or power-up via communications channel 16 or operator interface 56). The memory 54 may be discrete from receiver 14 (FIG. 6A) or may reside in memory 54 that is integrated in or on receiver 14 (FIG. 6B).

It should be noted that in one embodiment, information representative of the reference or slicer level(s) (for example, the actual reference or slicer level(s)) may be provided directly to phase detection and decision feedback equalization circuitry 36 via communications channel 16 or operator interface 56 (reflected by the dotted communication line in FIG. 6B). In this embodiment, the operator or an external device may program or re-program the slicer level(s) of data slicer(s) 22a and/or 22b and/or phase slicers 30a, 30b and/or 30c without first storing (or storing altogether) the reference or slicer levels (or information representative thereof) in memory 54. The adjustment or control of the reference or slicer level(s) may be before or during normal operation of receiver 14 and/or system 10. For example, an operator may provide information that is representative of the slicer level(s) in order to change, enhance and/or optimize the performance of phase detection and decision feedback equalization circuitry 36 in receiver 14. This information may be the actual slicer level(s) or adjustments, modifications and/or changes to be made to the slicer level(s) (i.e., relative information).

It should be further noted that the actual slicer level(s) or adjustments, modifications and/or changes to be made to the slicer level(s) may be provided directly to receiver 14 (to be implemented within phase detection and decision feedback equalization circuitry 36) or to a system controller (not illustrated) to distribute to receiver 14 and/or set of receivers 14a, 14b, 14c, etc. (not illustrated).

In another embodiment, the reference or slicer levels ($V_1$ and $V_2$ and/or $V_{11}$, $V_{12}$ and $V_{13}$) may be determined using adaptive processes that calculate or determine an appropriate, enhanced, optimum and/or superior slicer level based on predetermined criteria or criterion. In this regard, the reference or slicer levels may be adjusted, set and/or controlled during operation of the receiver and/or system in accordance with, for example, the response or operational characteristics of system 10, transmitter, 12 and/or receiver 14. The adjustment, setting and/or control of the slicer level(s) for decision feedback equalization circuitry 20 and phase detection circuitry 28 may be accomplished using an adaptive algorithm implemented by adaptive circuitry 58 maintained in, for example, receiver 14 (see, for example, FIGS. 6C-6F) or external thereto.

Notably, all adaptive techniques for determining the slicer level(s) (or information which is representative thereof), whether now known or later developed, are intended to be within the scope of the present invention of the decision feedback equalization circuitry. In one embodiment, system 10 and/or receiver 14 adapts the reference or slicer level of one or more data slicers 22a and/or 22b according to the "distance" of the reference or slicer level(s) of data slicers 22a and/or 22b to the edges of the receiver "eye". In this regard, with reference to FIGS. 6E, 6F and 7, receiver 14 includes margining circuitry 60, having one or more margining slicers 62 (for example, one or more cascaded high performance comparators or sense amplifiers) to determine the "distance" of the reference or slicer level(s) of data slicers 22a and/or 22b to the edges of the receiver "eye" by measuring and comparing the input data to a margining reference or slicer level ($V_{margining}$) that is used by the one or more margining slicers 62.

In particular, in one embodiment, the margining reference or slicer level is initially set at a level which is the same or substantially the same the level ($V_1$ or $V_2$) of data slicer 22a or 22b. The margining reference or slicer level may be initially set using any of the embodiments described here with respect to data slicers 22a and 22b.

In operation, the reference or slicer level ($V_{margining}$) of margining slicer 62 is adjusted or modified (via reference level adjustment circuitry 66) after a preset or predetermined number of "decisions", samples or outputs are obtained for a given or known data input value or sequence (for example, data transitions from high to low or low to high). The digital comparator circuitry 64 compares the predetermined number of "decisions", samples or outputs of margining slicer 62 to those of data slicer 22a or 22b while that slicer 22a or 22b is employed to measure a given or known data input value or sequence. When a preset number of "decisions", samples or outputs have been compared (for example, 128 samples or decisions), the comparison task is complete for that setting of the reference or slicer level of margining slicer 62; and the results analyzed by margining analysis circuitry 68.

The above margining process continues for different margining reference or slicer levels until margining analysis circuitry 68 identifies a given or predetermined number of disagreements (for example, ten) between or differences in the samples measured by data slicer 22a or 22b and margining slicer 62. Upon detecting the given or predetermined number of disagreements in the outputs of data slicer 22a or 22b and margining slicer 62, margining analysis circuitry 66 determines that the margining reference or slicer level that produced the given or predetermined number of disagreements is considered to be at an edge of the innermost portion of the receive "eye."

For example, in one embodiment, the margining reference or slicer level ($V_{margining}$) is initially set to the same value as the reference or slicer level ($V_2$) of data slicer 22b, which may be the "negative" or "lower" data slicer of decision feedback equalization circuitry 20. The "decisions", samples or outputs of margining slicer 62 are compared to those of data slicer 22b for a given or predetermined time period (given or predetermined number of samples) when slicer 22b is employed to measure a given or known data input value (for example, make a binary high decision) or data sequence (for example, high-to-low or low-to-high sequence). When a preset number of decisions have been compared, for example, 128 decisions, margining analysis circuitry 68 determines whether there are a given or predetermined number of "disagreements" or differences in the "decisions", samples or outputs of ("negative") data slicer 22b and margining slicer 62.

If the number of difference "decisions", samples or outputs of ("negative") data slicer 22b and margining slicer 62 did not meet or exceed the predetermined number, reference level adjustment circuitry 66 increases the reference or slicer level ($V_{margining}$) of margining slicer 62 (to make the reference or slicer level ($V_{margining}$) above the "negative" data slicer) and the sampling, comparing and analysis processes are repeated.

Figure 8A:
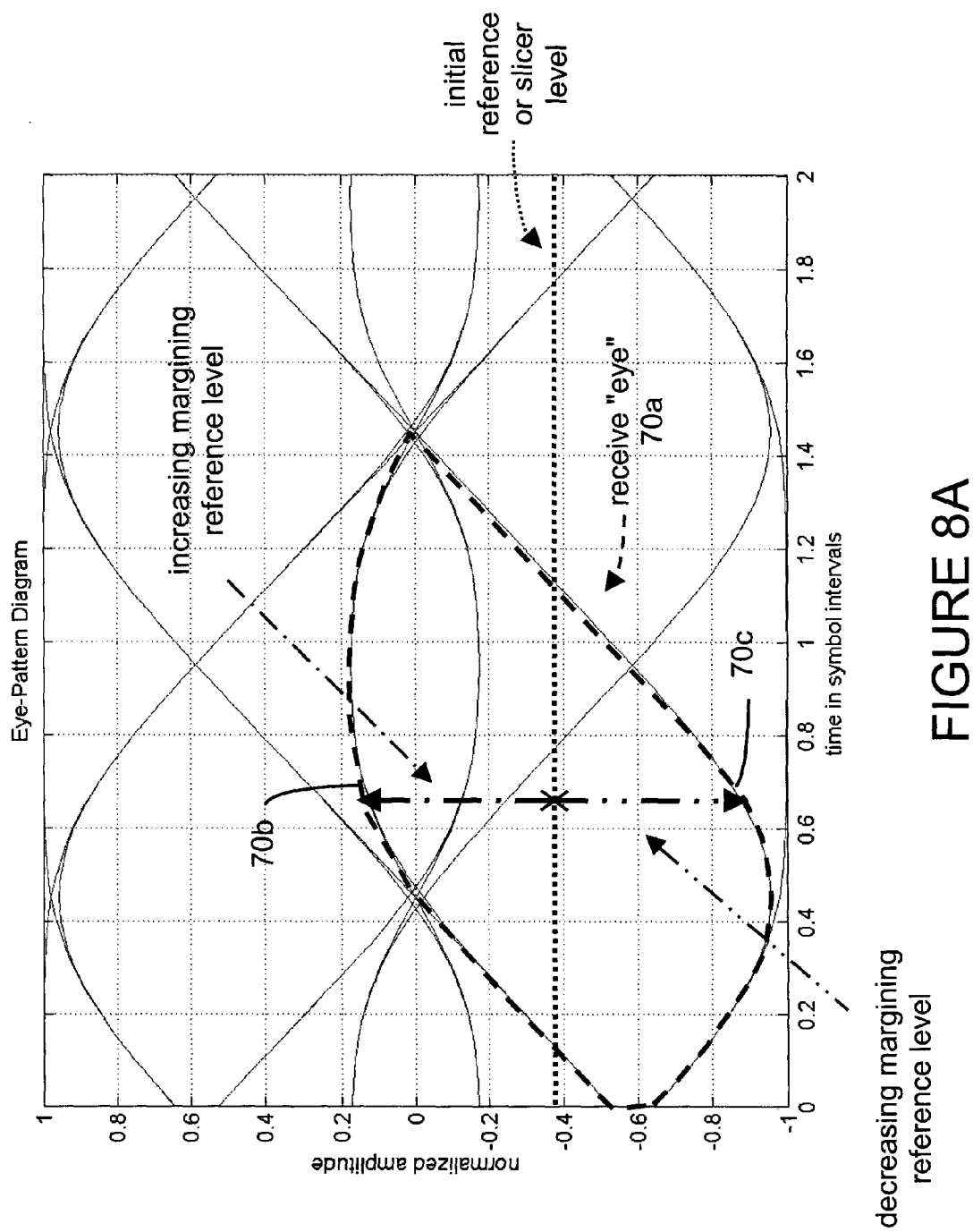
FIGS. 8A-8D illustrate receive "eye" diagrams in conjunction with margining or adaptation techniques, according to various aspects of the present invention.

Once margining analysis circuitry 68 determines or identifies a given or predetermined number of "disagreements" or differences in the "decisions", samples or outputs of the ("negative") data slicer 22b and margining slicer 62, slicer level ($V_{margining}$) of margining slicer 62 may be stored since the slicer level ($V_{margining}$) may be edge 70b of innermost portion of receive "eye" 70a (see, FIG. 8A). Moreover, the difference between the slicer level of the negative data slicer and innermost "edge" 70b of receive "eye" 70a may also be stored.

Thereafter, margining slicer 62 may be reset back to the initial reference or slicer level and the process performed again with the exception that the reference level is "decreased" in order to identify opposing edge 70c of innermost portion of receive "eye" 70a (see, FIG. 8A). The difference between the reference or slicer level of the negative data slicer and (opposing) innermost "edge" 70c of receive "eye" 70a may also be stored.

In one embodiment, adaptive circuitry 58 employs the information of the "distances" (i.e., defined by normalized amplitude, volts or amperes) between the edges of the receive eye to adjust, modify and/or control the reference level of data slicers 22a and/or 22b. In this regard, in one embodiment, if the magnitudes of the distance from the reference level of the data slicer to the (innermost portion) edges of the eye differ, then adaptive circuitry 58 may adjust, modify and/or control the reference level of data slicers 22a and/or 22b to eliminate, reduce and/or minimize that difference.

With reference to FIG. 8A, in one embodiment, if the magnitude of the distance between edge 70b of the innermost portion of receive "eye" 70a is greater than the magnitude of the distance between edge 70c of the innermost portion of receive "eye" 70a the reference or slicer levels ($V_1$ and/or $V_2$) of data slicers 22a and/or 22b are adjusted, modified and/or controlled, for example, moved "closer" to each other.

In another embodiment, the reference or slicer level of one of the data slicers (for example, "negative" data slicer 22b) level may be "moved" closer to the reference or slicer level of the other slicer (for example, data slicer 22a). In this regard, the slicer level of a selected data slicer (for example, the negative data slicer) is changed, modified or re-programmed so that the difference between the slicer levels of data slicers 22a and 22b is less than before adaptation. As such, in this embodiment, the slicer level of the other data slicer is not moved from its preset, predetermined, programmed or fixed level.

Figure 8B:
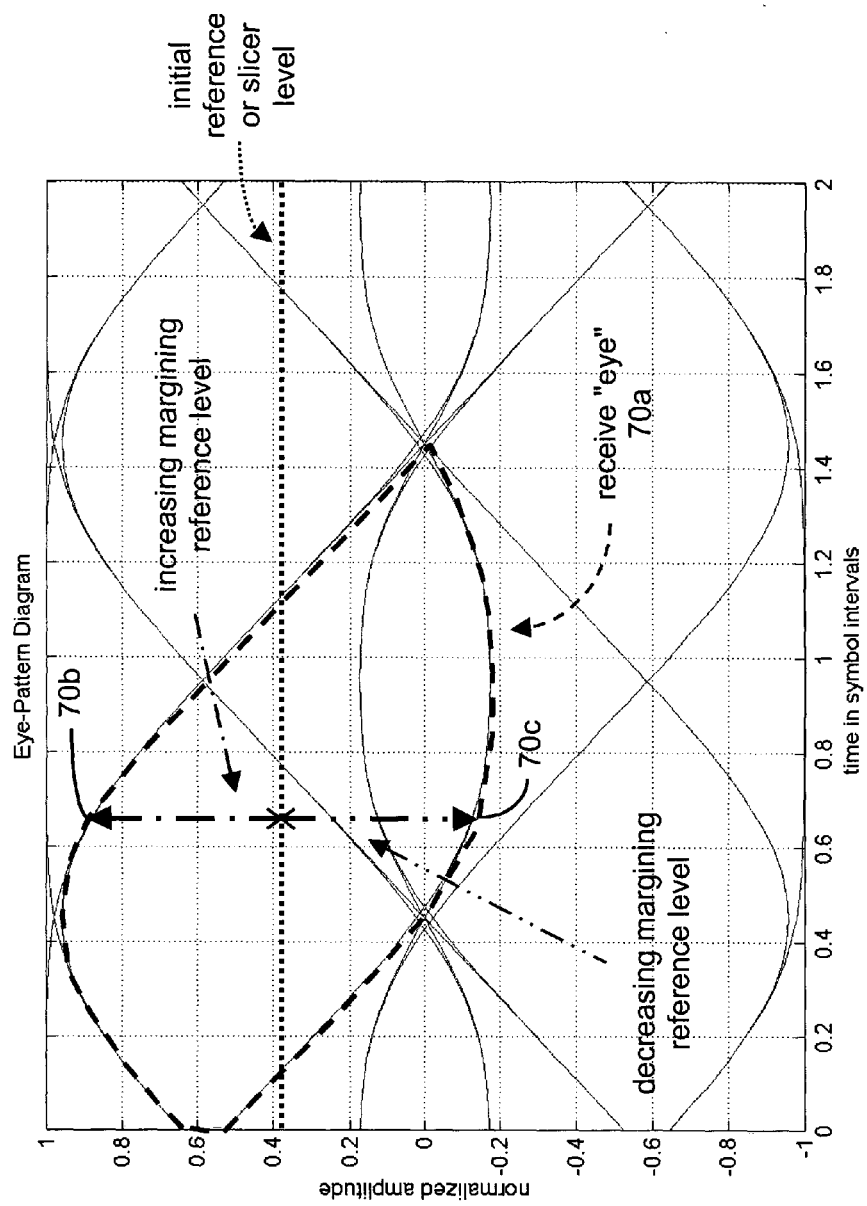

Notably, in addition to, or in lieu of, the margining and adaptation processes or procedures with respect to the "negative" data slicer (for example, 22b), adaptive circuitry 58 and margining circuitry 60 may employ the "positive" data slicer (for example, 22a), and slicer level ($V_1$) (see, FIG. 8B). In this embodiment, because the magnitude of the "distance" (which is defined in normalized amplitude, volts or amperes) to edge 70b of receiver "eye" 70a is greater than the magnitude of the "distance" to edge 70c, then the two data slicer levels ($V_1$ and $V_2$) are moved further apart. Moreover, as mentioned above with respect to the "negative" data slicer, where the margining and adaptive procedures suggest a modification of the slicer levels, the reference or slicer level ($V_1$) of the "positive" data slicer (i.e. 22a) may be "moved" closer to the "negative" data slicer (i.e., 22b). In this regard, the slicer level ($V_1$) of data slicer 22a is changed, modified or re-programmed so that the slicer level ($V_1$) is closer (which is defined in normalized amplitude, volts or amperes) to the slicer level ($V_2$); and the slicer level ($V_2$) of the "negative" data slicer (i.e., 22b) is not moved from its preset, predetermined, programmed or fixed level.

Indeed, in one embodiment, the adaptive techniques may be implemented using both the positive data slicer and the negative data slicer. For example, the margining techniques described above may be employed with respect to the positive data slicer and the negative data slicer, for example, sequentially. The results of the margining procedure may be employed for each of the positive and negative data slicers individually (i.e., in a mutually exclusive manner), as described above, or may be employed in combination, for example, the data slicer levels are only "moved" (i.e., adjusted, modified or controlled) if the margining procedure for both data slicer levels are in "agreement"; that is, both margining decisions indicate the data slicer levels for the positive and negative data slicers should be moved either closer or further apart.

Additionally, an adaptive algorithm that uses the above measured distance(s) or the difference of the above measured distance(s) as the error metric may control the movement of the data and/or margining slicers.

Furthermore, in one embodiment the phase slicer reference levels ($V_{11}$, $V_{12}$ and $V_{13}$) are adapted such that the most positive phase slicer reference level is set to be the same or substantially to be the same value as the most positive data slicer level and the most negative phase slicer reference level is set to be the same or substantially to be the same value as the most negative data slicer level. The intermediate phase slicer reference level may be maintained at a value of zero or adapted to be half way between the most positive and most negative phase slicer reference levels.

In one embodiment the phase slicer reference levels are adapted or controlled such that most positive phase slicer reference level is set to be proportional to the most positive data slicer level and the most negative phase slicer reference level is set, adapted or controlled to be proportional to be the same value as the most negative data slicer level. The intermediate phase slicer reference level may be maintained at a value of zero or adapted to be half way between the most positive and most negative phase slicer reference levels. In another embodiment, phase slicer reference levels are adapted such that most positive phase slicer reference level is set to maintain a known offset with respect to the most positive data slicer level and the most negative phase slicer reference level is set to maintain a known offset with respect to the most negative data slicer level. The intermediate phase slicer reference level may be maintained at a value of zero or adapted to be half way between the most positive and most negative phase slicer reference levels.

Figure 7:
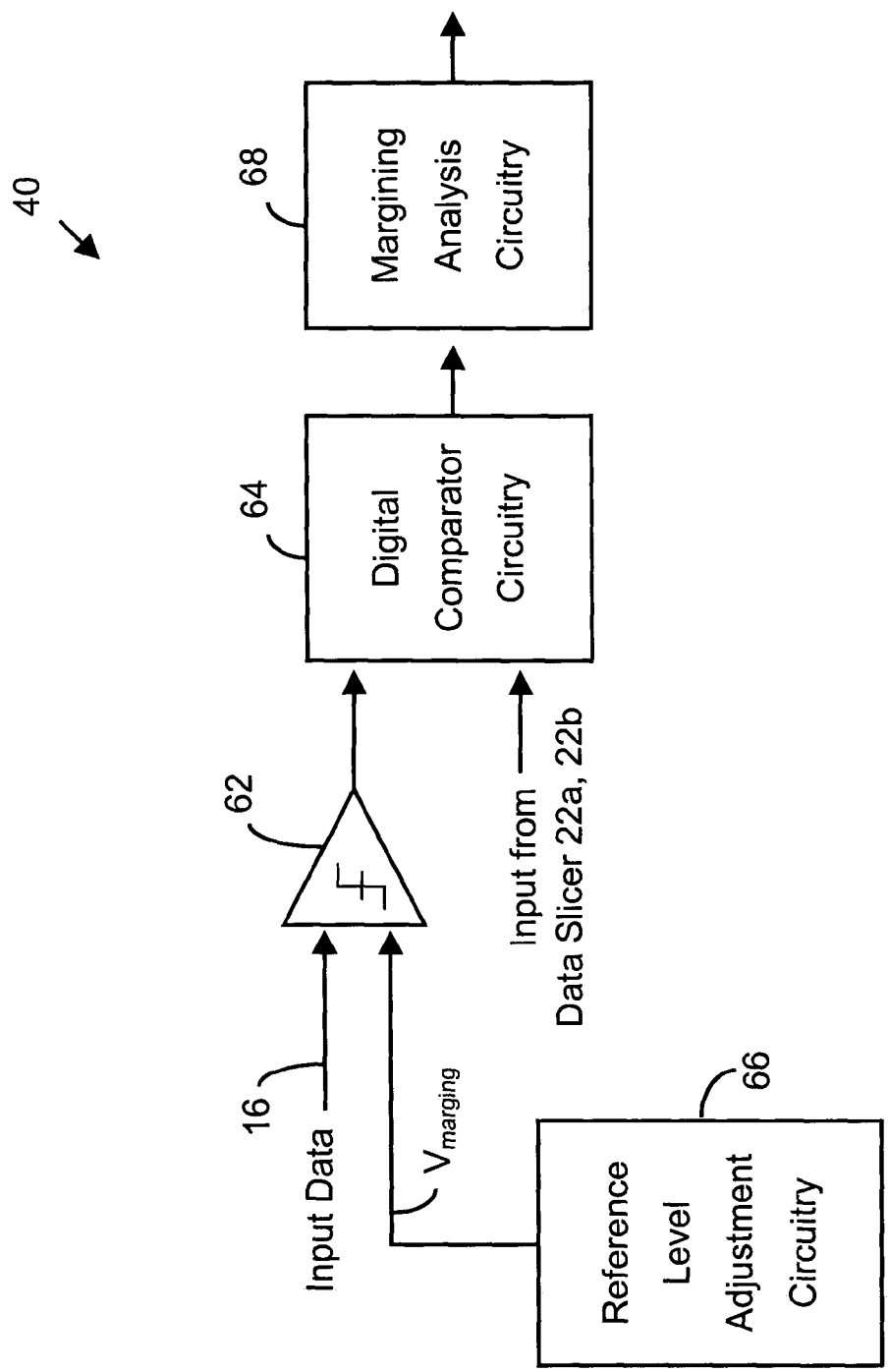
FIG. 7 illustrates margining circuitry, used in conjunction with adaptive circuitry and techniques, according to various aspects of the present invention.

It should be noted that, with reference to FIG. 7, reference level adjustment circuitry 66 may be a digitally controlled digital-to-analog converter ("DAC"), for example, a DAC like that described in "System and Method for Providing Slicer Level Adaptation", application Ser. No. 10/222,073, the contents of which are incorporated by reference herein. The DAC may be controlled by a processor and/or a state machine that, in conjunction with the reference level adjustment circuitry 66, implements the desired reference level adjustment "algorithm", for example, the margining processes described above.

The digital comparator logic 64 may be, for example, a processor (that is appropriately programmed), a state machine, or an XOR gate that receives the outputs of the slicers and determines whether the outputs are the same or different. The comparator logic may also include multiplexers to control or route the appropriate or desired slicer output(s) for comparison with the output of margining slicer 62.

The margining analysis circuitry 68 may be, for example, a processor (that is appropriately programmed), a state machine or a counter that determines whether the number of differences between the outputs of the slices exceeds a given or predetermined number. Where the margining analysis circuitry 68 is a counter, the counter may be designed to reset after the predetermined number of samples as well as set a flag or issue a command if the difference count exceeds a given or predetermined number.

Notably, more than one margining slicer 62 may be employed in the margining process in order to, for example, accelerate the adaptation process. Moreover, digital comparator circuitry 64, reference level adjustment circuitry 66 and/or margining analysis circuitry 68 may be adapted to accommodate the plurality of margining slicers 62. That is, digital comparator circuitry 64, reference level adjustment circuitry 66 and/or margining analysis circuitry 68 may include circuitry to determine margining data regarding positive and negative data slicers, for example, sequentially or in parallel.

The "movement" of margining slicer 62 (i.e., modification, adjustment and/or control of the margining slicer levels by reference level adjustment circuitry 66) may be monotonically increasing or decreasing, as described above, a binary search, or other numerical algorithm for determining or dictating the "movement", adjustment or control of margining slicer 62 (i.e., the change or modification of the slicer level (for example, in volts or amperes) of the margining slicer) to facilitate collection of system margin information.

Indeed, all techniques, sequences and/or algorithms for adjusting or controlling margining slicer 62 (i.e., the amount of change or modification of the slicer level of the margining slicer), whether now known or later developed, are considered to be within the present invention.

As mentioned above, there are many margining techniques for acquiring information regarding the characteristics, performance and/or operation of system 10, transmitter 12, and/or receiver 14. All techniques, criteria, processes, algorithms and/or procedures for implementing the margining procedure, control or sequence of the input data, and/or for movement, adjustment or control of the margining slicers, whether now known or later developed, are considered to be within the present invention. For example, the margining procedures may include obtaining performance or operational information regarding phase sampling data that is employed by the adaptive circuitry 38 to control, optimize, enhance and/or change the slicer levels ($V_1$ and/or $V_2$) of data slicers 22a and/or 22b and/or change the slicer levels ($V_{11}$ and/or $V_{12}$ and/or $V_{13}$) of the phase slicers 30a and/or 30b and/or 30c or other circuitry in receiver 14. In this regard, margining slicer 62 may be employed to determine an optimum, enhanced and/or suitable point or moment of sampling of the phase data, used for timing or clock recovery related information.

Figure 8C:
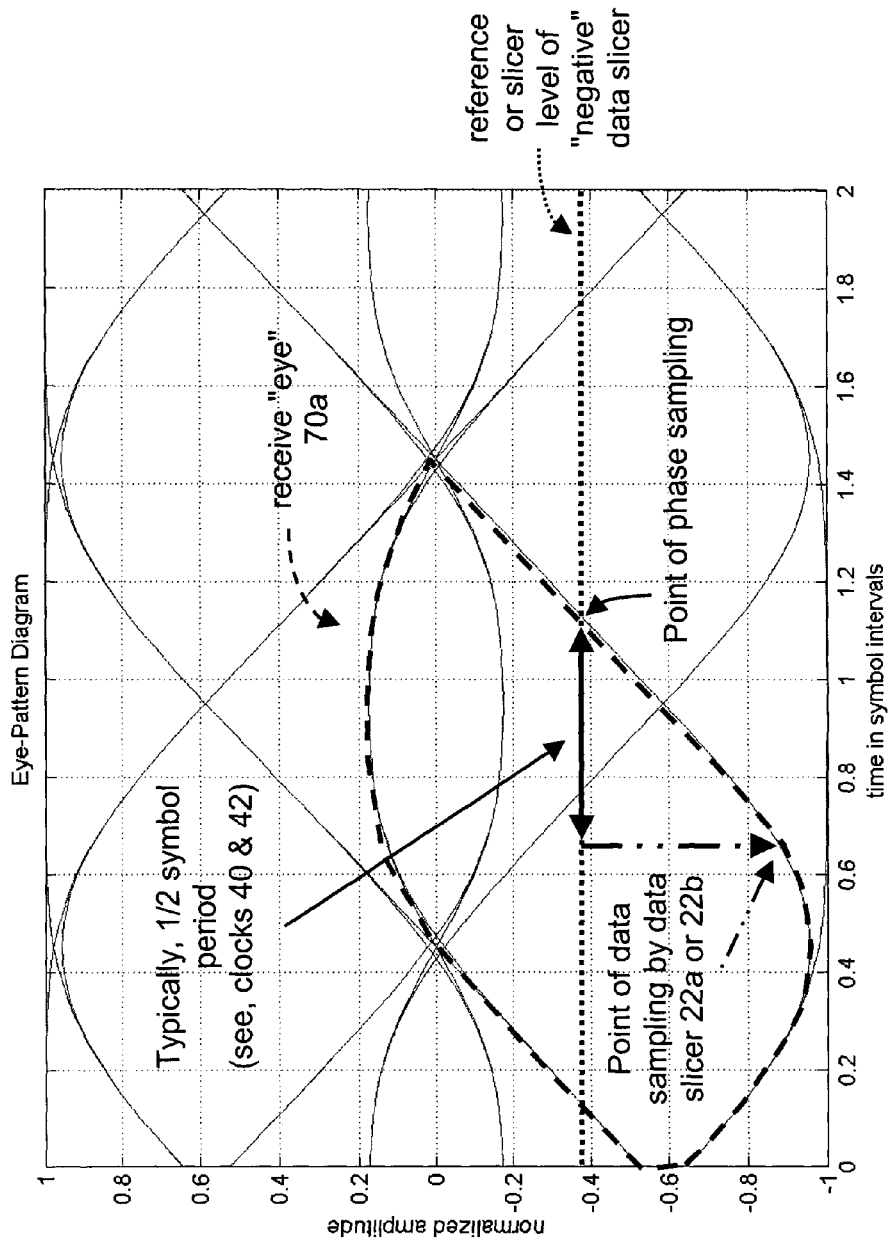

In particular, with reference to FIG. 8C, after the reference or slicer level ($V_{margining}$) of margining slicer 62 is set to the reference or slicer level of the "negative" data slicer, margining slicer 62 samples the input for those specific data patterns when the input signal is expected to be crossing the reference or slicer level. If margining slicer 62 provides a positive sample as determined by the digital comparator circuitry 64 and/or margining analysis circuitry 68, then the phase sampling point may be too early. If, however, the sample is negative, then the phase sampling point may be too late. Using this information, margining analysis circuitry 68 may adjust the data sampling point (by adjusting the reference or slicer level) to thereby provide a more enhanced, optimum and/or different timing or clock recovery sampling point. In this regard, the data sampling point and the phase sampling point may be "ganged" so that adjusting or moving either sampling point adjusts or moves the other sampling point—while maintaining the typical one-half symbol period between the data and phase sampling points. For example, by adjusting the phase sampling point to more fully coincide with the crossing the reference or slicer level, the data sampling point is adjusted accordingly as the typical one-half symbol period between the data and phase sampling points is maintained.

Figure 8D:
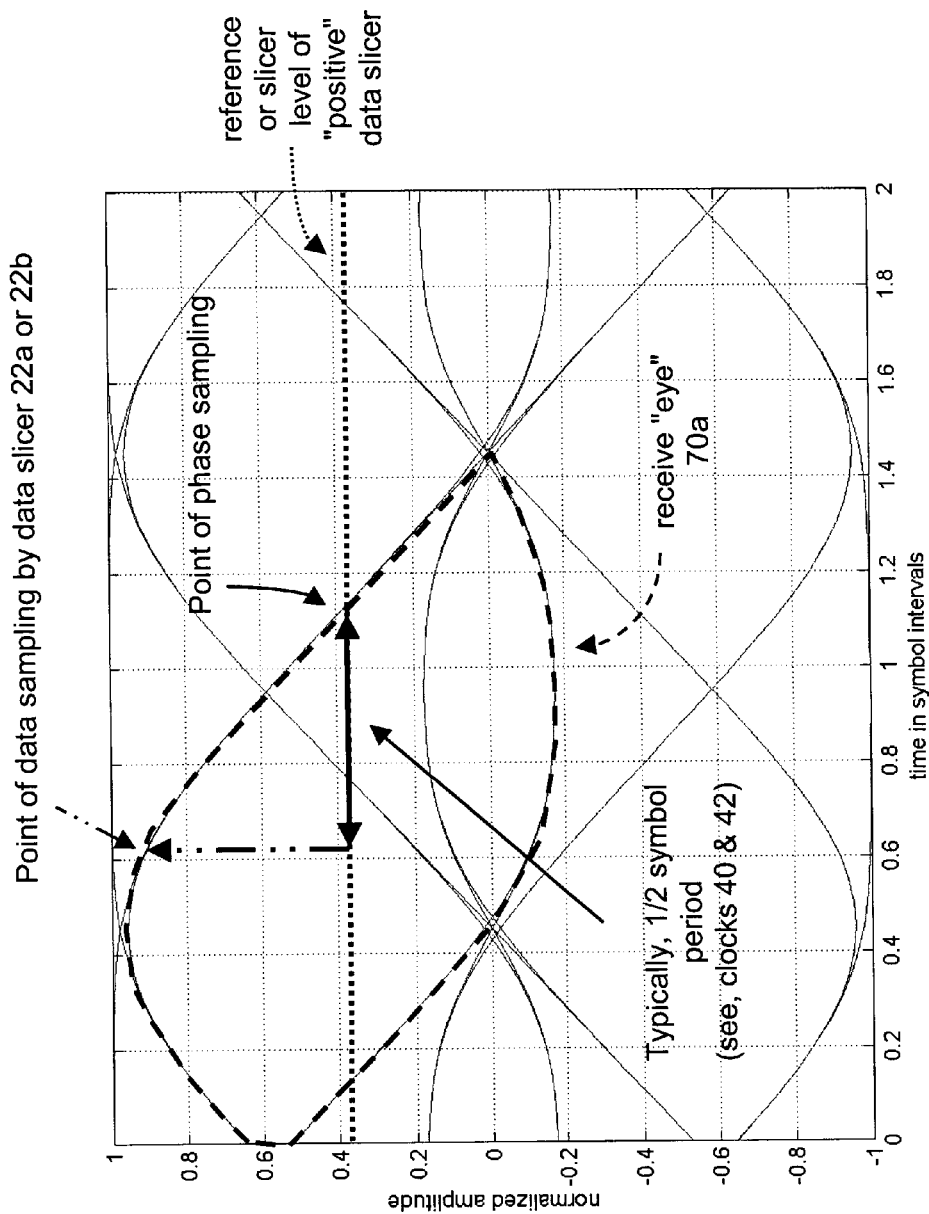

The technique described immediately above may also be employed relative to the "positive" data slicer (see, FIG. 8D), "negative" data slicer (see, FIG. 8C), or both. In this regard, the reference or slicer level ($V_{margining}$) of margining slicer 62 is set to the reference or slicer level of the "positive" data slicer, and margining slicer 62 samples the input when the input signal is expected to be crossing the reference or slicer level. The technique is essentially the same as described above and, for the sake of brevity, that discussion will not be repeated.

In one embodiment, the adaptive techniques of adjusting the data and phase sampling points in a ganged manner may be implemented using both the positive data slicer and the negative data slicer. For example, the margining techniques described above may be employed with respect to the positive data slicer and the negative data slicer, for example, sequentially or in parallel. The results of the margining procedure may be employed for each of the positive and negative data slicers individually (i.e., in a mutually exclusive manner), as described above, or may be employed in combination, for example, in those instances where "movement" (i.e., adjusted, modified or controlled) of the data slicer levels are in "agreement"; that is, both margining decisions indicate the data slicer levels for the positive and negative data slicers should be moved either closer or further apart.

Thus, as mentioned above, there are many adaptive techniques for setting, controlling, optimizing, enhancing and/or changing the slicer levels ($V_1$ and/or $V_2$) of data slicers 22a and/or 22b and slicer levels ($V_{11}$, $V_{12}$ and/or $V_{13}$) of phase slicers 30a, 30b and/or 30c. All adaptive techniques, processes, algorithms and/or procedures for (directly or indirectly) setting, controlling, optimizing, enhancing and/or changing the slicer levels ($V_1$, $V_2$, $V_{11}$, $V_{12}$ and/or $V_{13}$), and/or (directly or indirectly) controlling, optimizing, enhancing and/or changing the performance of data slicers 22a and/or 22b and/or phase slicers 30a, 30b and/or 30c, whether now known or later developed, are considered to be within the present invention.

Indeed, in one set of embodiments of indirectly controlling, optimizing, enhancing and/or changing the performance of data slicers 22a and/or 22b, rather than directly adjusting reference or slicer levels ($V_1$ and/or $V_2$), the bandwidth of receiver 14 may be adaptively decreased or increased until a desired or predetermined set of data slicer reference levels ($V_1$ and $V_2$) provide equal "distances" from, for example, a common voltage, using, for example, the aforementioned process for measuring the distance from the data slicers. In this regard, where the aforementioned margining technique is employed and the result indicates that moving the data slicer levels closer together may provide a optimized, enhanced and/or different response, the bandwidth of receiver 14 may be modified, controlled and/or changed (for example, reduced). In contrast, where the aforementioned margining technique is employed and the result indicates that moving the data slicer levels farther apart may provide a optimized, enhanced and/or different response, the bandwidth of receiver 14 may again be modified, controlled and/or changed (for example, increased). In this set of embodiments, the receiver bandwidth is modified, controlled and/or changed to optimize, enhance and/or change the response of data slicers 22a and 22b and thereby enhance the recovery by receiver 14 of the transmitted data.

It should be noted that a combination of moving the data slicer levels ($V_1$ and $V_2$) of data slicers 22a and 22b, in conjunction with changing the bandwidth of receiver 14, may also be employed to enhance the recovery by receiver 14 of the transmitted data. Indeed, as mentioned above, all adaptive techniques, processes, algorithms and/or procedures for setting, controlling, optimizing, enhancing and/or changing the slicer levels ($V_1$ and/or $V_2$), and/or controlling, optimizing, enhancing and/or changing the performance of data slicers 22a and/or 22b, whether now known or later developed, are considered to be within the present invention.

Thus, the decision feedback equalization circuitry of the present invention employs a plurality of data slicers (for example, two) to receive an analog input and responsively output a binary value based on the reference or slicer level. These data slicers employ slicer levels that may be fixed, pre-programmed, predetermined, preset, changed, modified, optimized, enhanced and/or programmed or re-programmed (for example, adaptively) before or during operation of the decision feedback equalization circuitry.

The output of the data slicers is provided to logic circuitry to determine whether the analog input was a first state (binary or logic high) or a second state (binary or logic low). In those instances where the data slicers "agree" and both indicate either a high or a low, the logic circuitry outputs the corresponding binary or logic value. In those instances where the data slicers do not "agree"—that is, where one data slicer indicates the data to be a binary or logic high value and another data slicer indicates the data to be a binary or logic low value, in one embodiment, the logic circuitry outputs the complement of the previous binary value. In another embodiment, the logic circuitry selects the output from the slicer that changed the state of its output relative to the state of the output from the previous sample or symbol. In yet another embodiment, the logic circuitry selects the output of the decision of the slicer with higher slicer value if the previous state or logic value was "high"; and selects the output of the decision of the slicer with lower slicer value if the previous state or logic value was "low".

There are many inventions described and illustrated herein. While certain embodiments, features, materials, configurations, attributes and advantages of the inventions have been described and illustrated, it should be understood that many other, as well as different and/or similar embodiments, features, materials, configurations, attributes, structures and advantages of the present inventions that are apparent from the description, illustration and claims. As such, the embodiments, features, materials, configurations, attributes, structures and advantages of the inventions described and illustrated herein are not exhaustive and it should be understood that such other, similar, as well as different, embodiments, features, materials, configurations, attributes, structures and advantages of the present inventions are within the scope of the present invention.

Figure 9A:
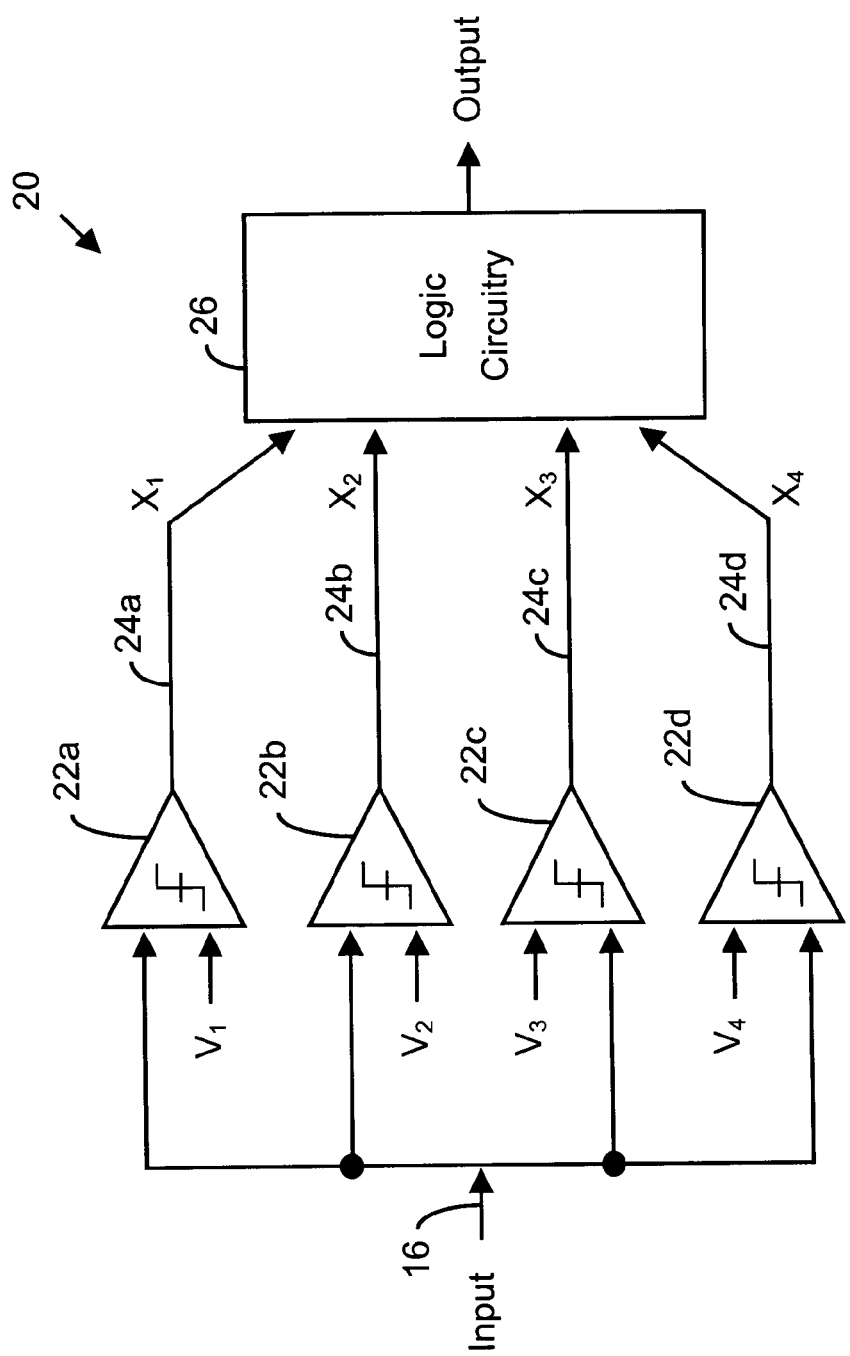
FIG. 9A is an illustration of a decision feedback equalization topology, including four slicers and data samples ($X_1$ to $X_4$), according to an aspect of the present invention.
Figure 9B:
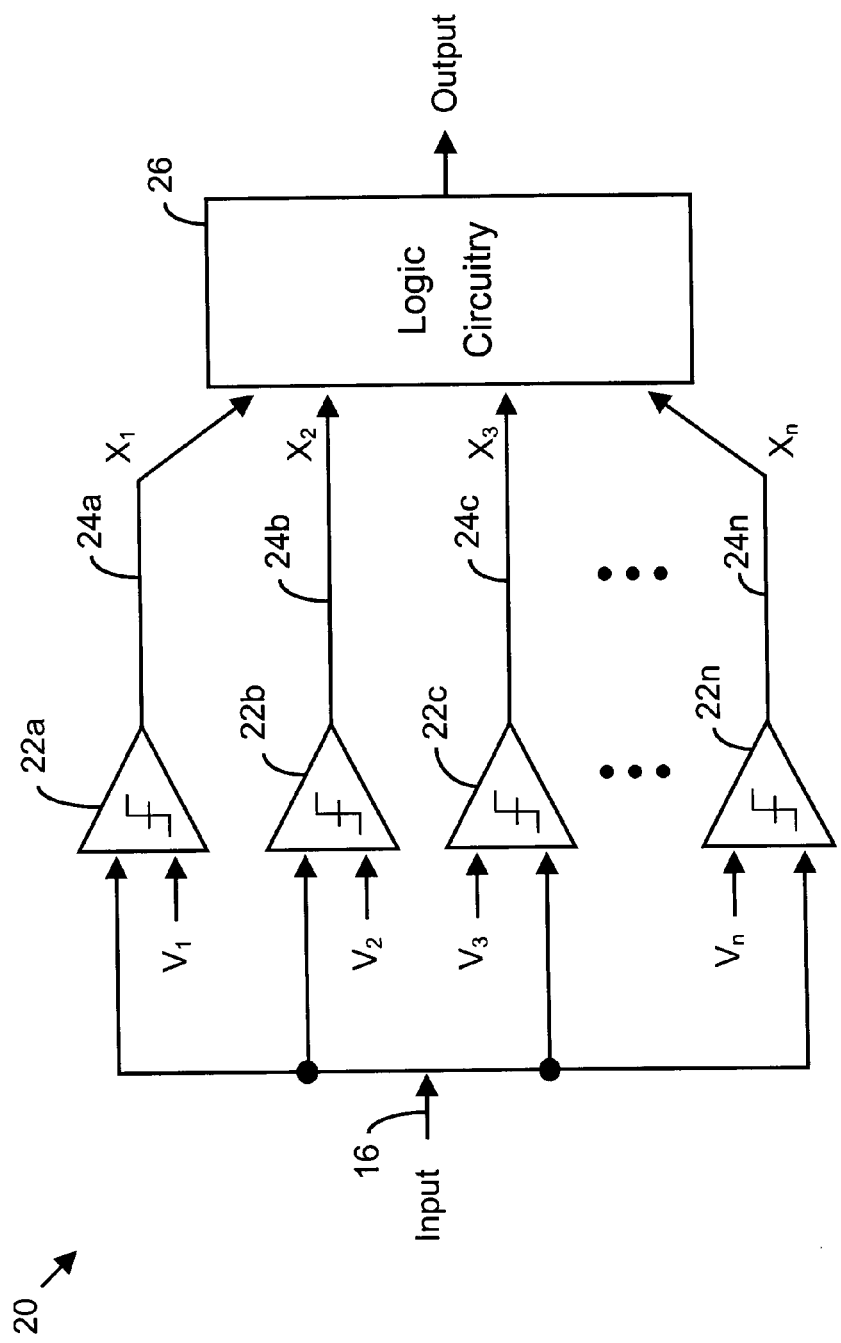
FIG. 9B is an illustration of a decision feedback equalization topology, including "n" number of slicers and data samples ($X_1$ to $X_n$), according to an aspect of the present invention.
Figure 10:
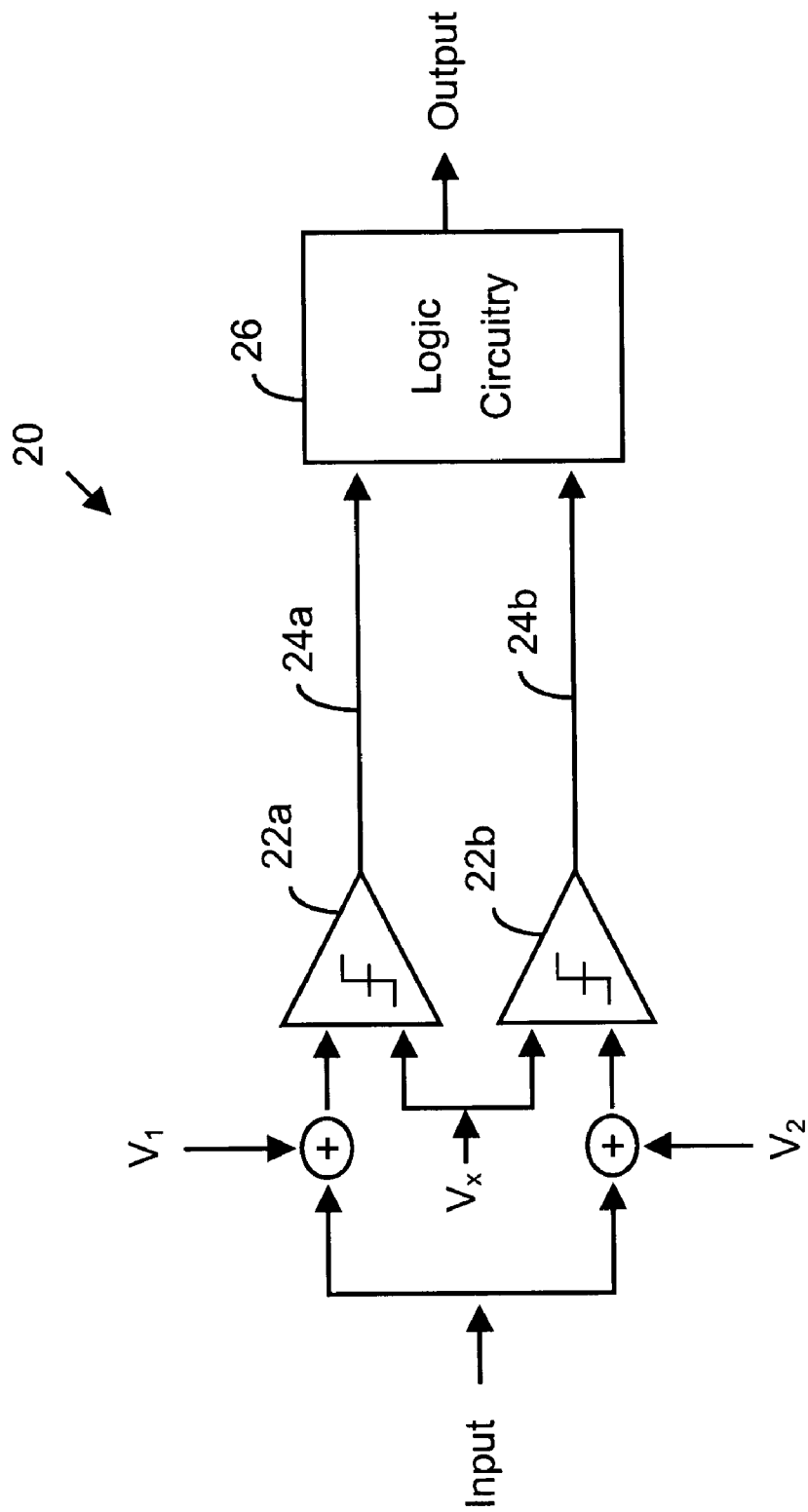
FIG. 10 illustrates one of many alternative implementations or topologies of the decision feedback equalization circuitry of the present invention.
Figure 11A:
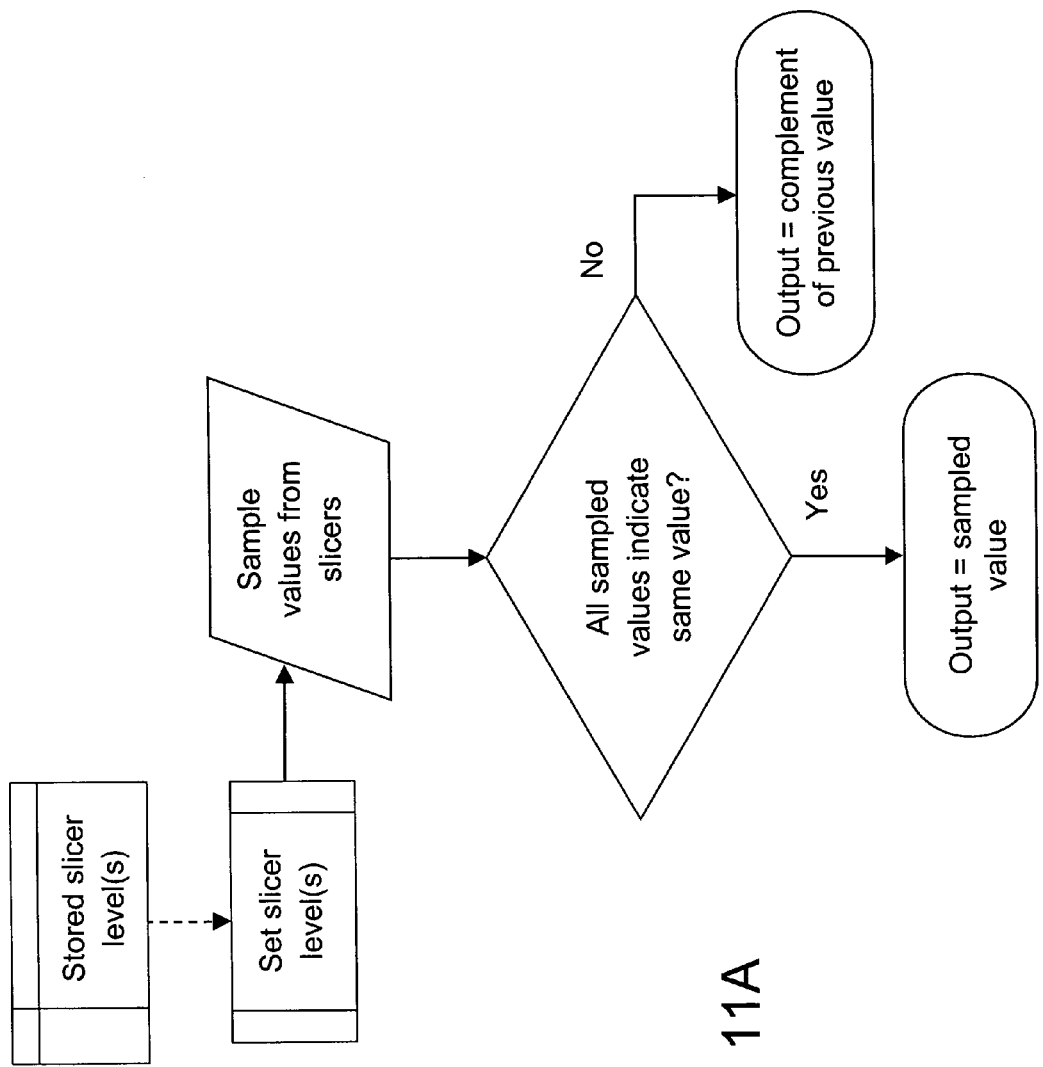
FIGS. 11A-11E illustrate flowcharts of exemplary processes of the logic circuitry, in conjunction with the various techniques of providing reference or slicer level information, according to various aspects of the present invention.
Figure 11B:
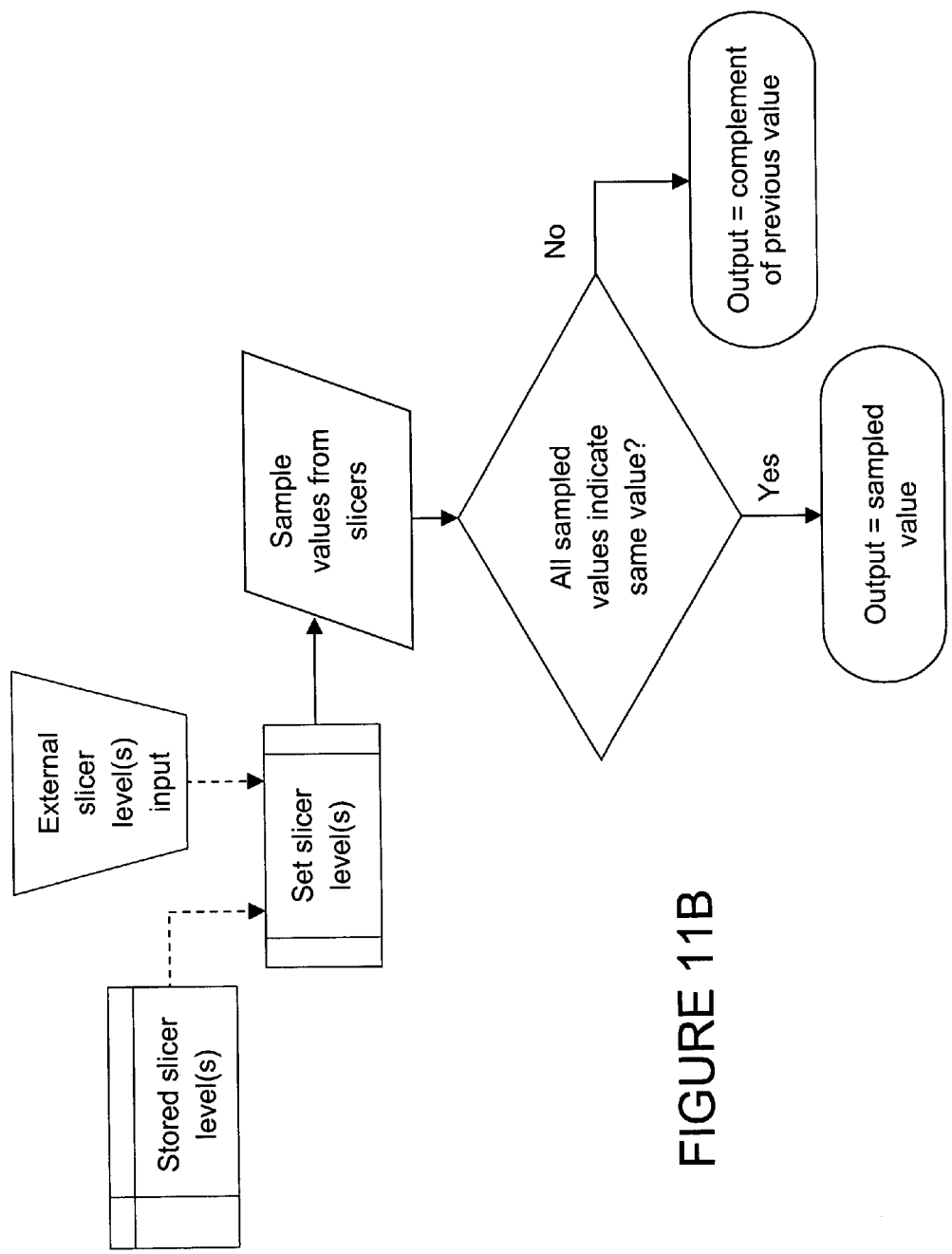
Figure 11C:
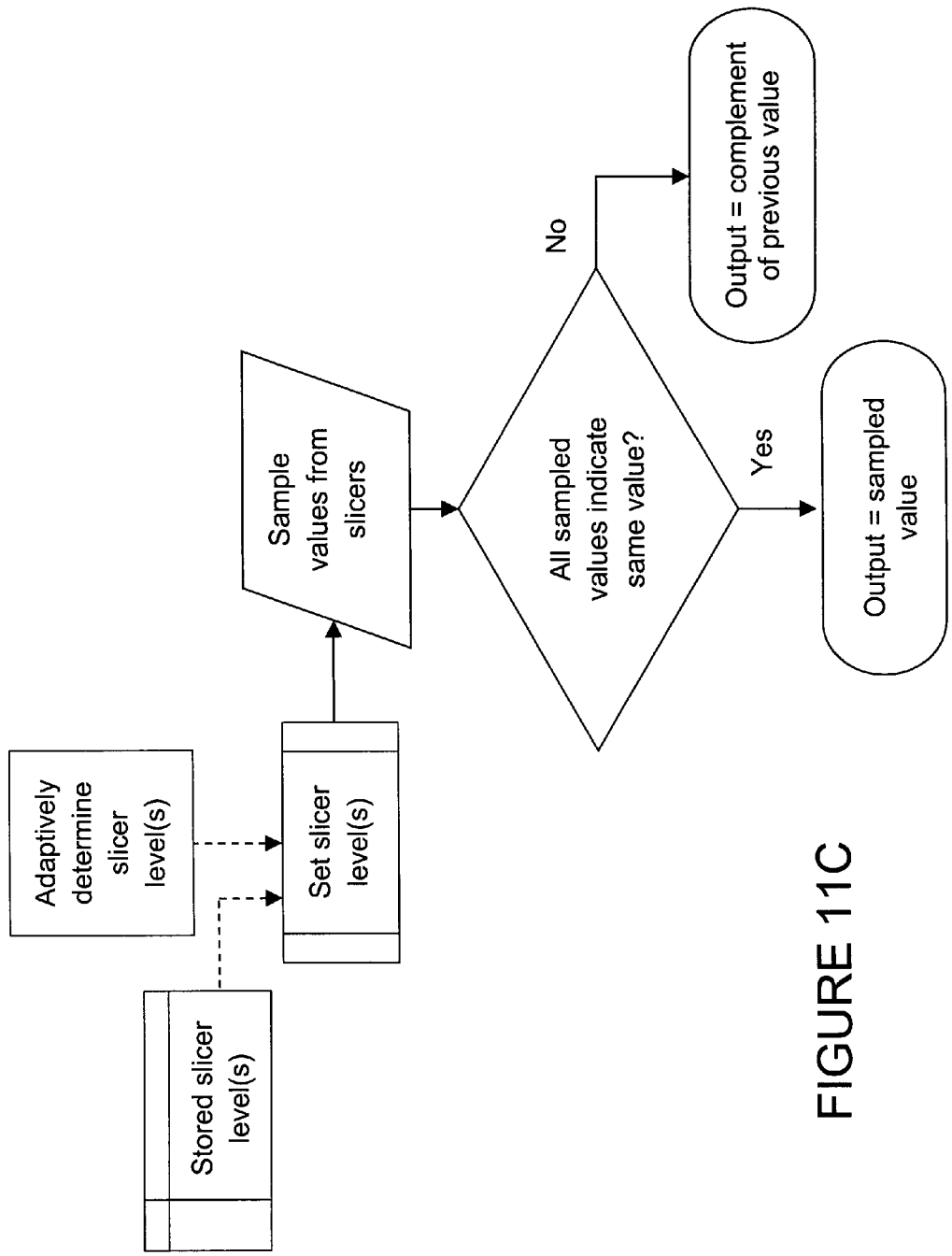
Figure 11D:
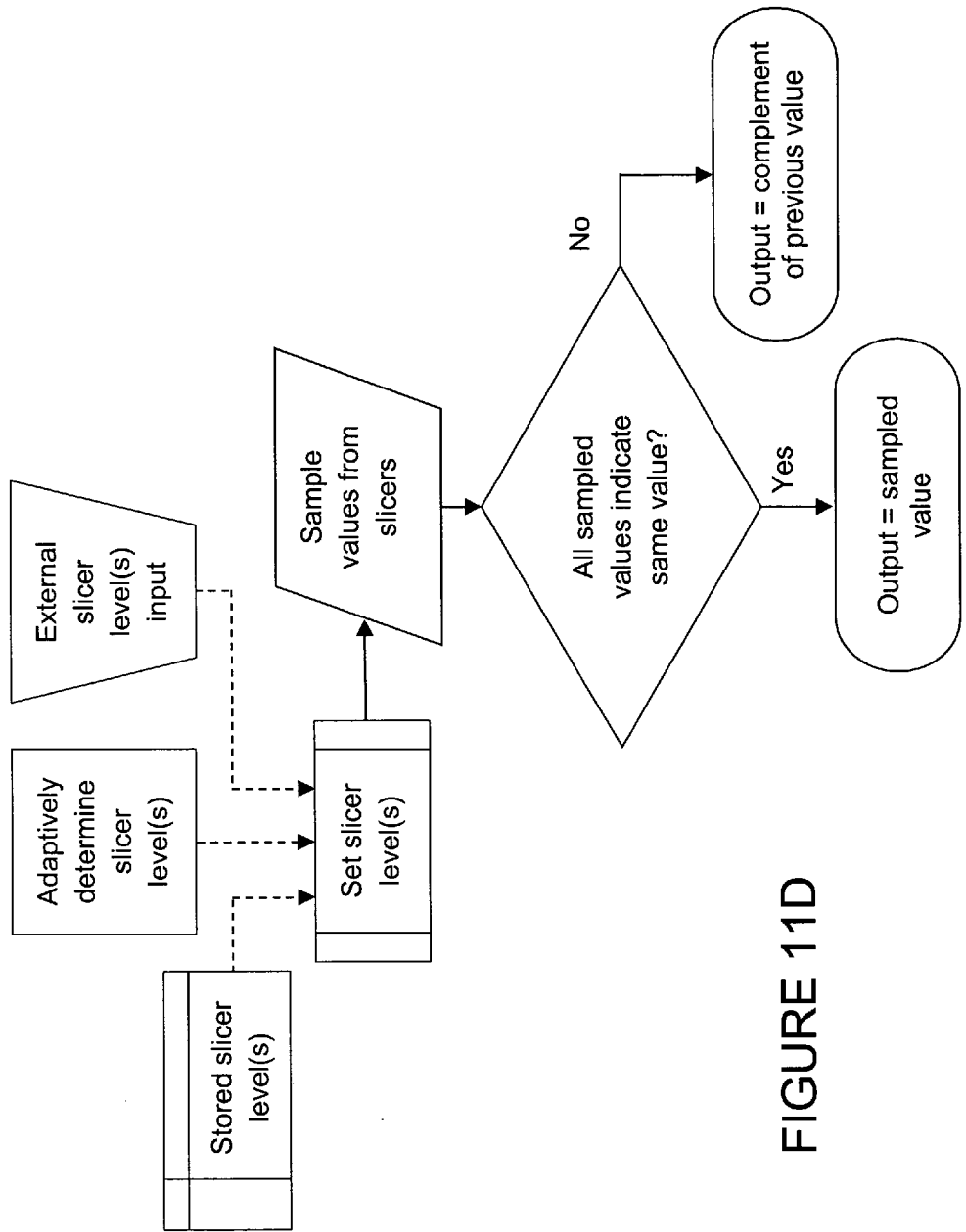
Figure 11E:
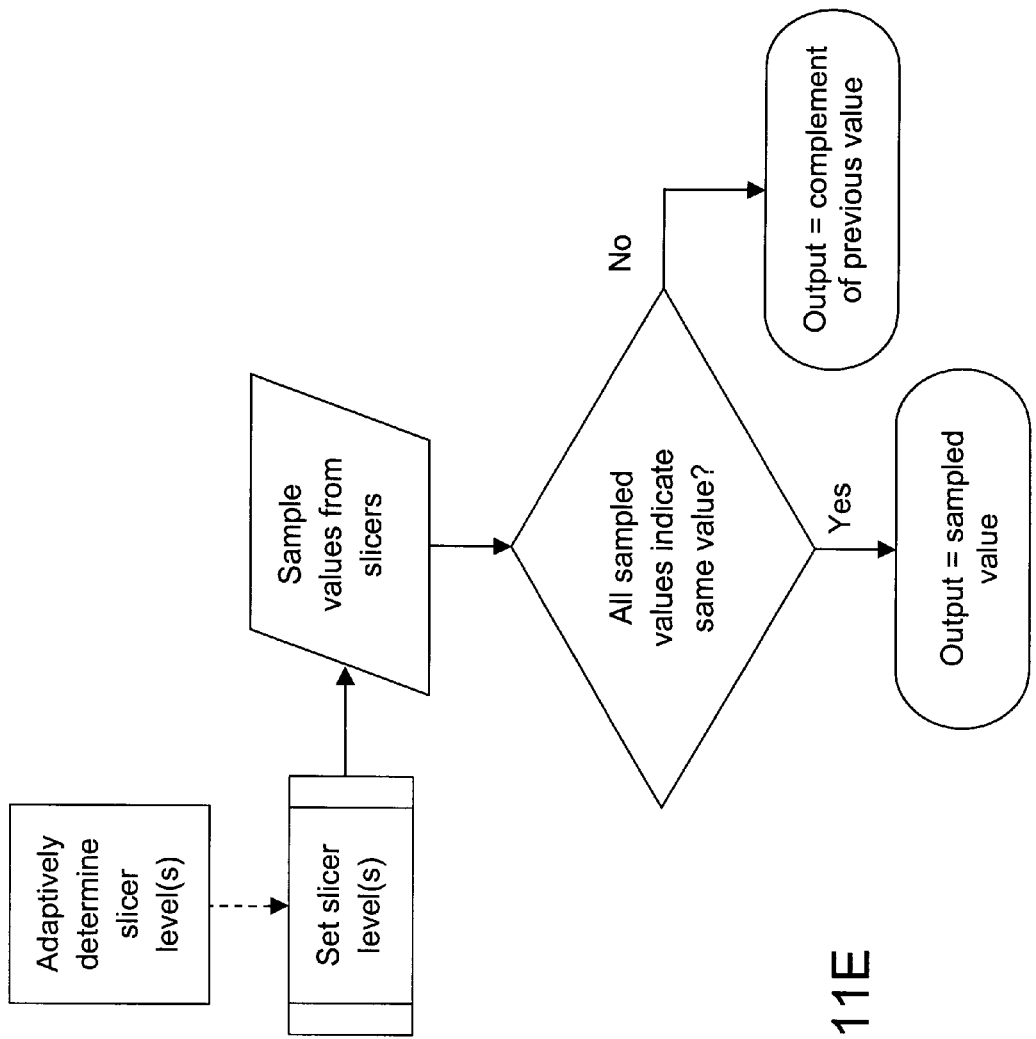

For example, while the present invention has been described in detail with respect to the illustrative and exemplary embodiments including two data slicers 22a and 22b to compensate for inter-symbol interference from one previous transmitted data in a particular decision feedback equalization topology or configuration (see, FIG. 3A), more than two data slicers may be employed to compensate for inter-symbol interference from more than just one previous data bit (see, for example, FIGS. 9A and 9B) and other decision feedback equalization configurations or topologies (see, for example, FIG. 10) may be employed in accordance with the present invention. Indeed, all of the embodiments described above (for example, the embodiments regarding setting, programming, controlling, modifying and/or changing the reference or slicer level of the data slicers) may be implemented in conjunction with more than two data slicers and other decision feedback equalization configurations or topologies. For the sake of brevity, those discussions will not be repeated.

Similarly, while the present invention has been described in detail with respect to the illustrative and exemplary embodiments including three phase slicers 30a-c for phase detection circuitry 28 in a particular topology or configuration (see, FIG. 3B), more than three phase slicers may be employed to measure the crossings of more trajectories and other phase detector configurations or topologies may be employed in accordance with the present invention. Indeed, all of the embodiments described above (for example, the embodiments regarding setting, programming, controlling, modifying and/or changing the reference or slicer level of the phase slicers) may be implemented in conjunction with more than three phase slicers and other phase detector configurations or topologies. For the sake of brevity, a discussion of those embodiments will not be repeated.

In addition, the data and/or phase slicers of the present invention may be implemented, designed and/or configured to employ differential inputs. As such, each data and/or phase slicer would include two inputs and the high performance sense amplifier(s) would employ those inputs to determine the logic state (for example, logic high or logic low) of the input data. Again, all of the embodiments described above (for example, the embodiments regarding setting, programming, controlling, modifying and/or changing the reference or slicer level of the data and/or phase slicers) may be implemented in conjunction with data and/or phase slicers employing differential inputs, including, for example, the embodiments including more than two data slicers (or three phase slicers) and other decision feedback equalization (and/or phase detector) configurations/topologies discussed immediately above. For the sake of brevity, the discussions will not be repeated.

Moreover, all permutations of setting, programming, controlling, modifying and/or changing the reference or slicer level of the data and/or phase slicers may be employed in the present invention. As mentioned above, the reference or slicer levels (or information representative thereof) may, for example, be stored, externally supplied (for example, via an operator or via a device or system), and/or adaptively determined, adjusted or controlled (see,for example, FIGS. 11A-11E). Notably, all adaptive techniques for determining, calculating, setting, and/or re-setting the slicer level(s), whether now known or later developed, are intended to be within the scope of the present invention.

In addition, all permutations of setting, programming, controlling, modifying and/or changing the reference or slicer level of the phase slicers may be employed in the present invention, including those described with respect to the data slicers. As such, the reference or slicer levels (or information representative thereof) of the phase slicers may, for example, be stored, externally supplied (for example, via an operator or via a device or system), and/or adaptively determined, adjusted or controlled. Notably, all adaptive techniques for determining, calculating, setting, and/or re-setting the slicer level(s) of the phase slicers, whether now known or later developed, are intended to be within the scope of the present invention.

It should be noted that the present invention may be implement in conjunction with other equalization techniques and circuitry. For example, the circuitry and techniques described in U.S. patent application Ser. No. 10/269,446 may be employed in the transmitter of the communications system and the circuitry and techniques of the present invention may be employed in an associated or corresponding receiver. In this way, the system employs both transmitter and receiver based equalization techniques and data communications may be highly optimized and/or enhanced. The contents of U.S. patent application Ser. No. 10/269,446 are incorporated herein by reference.

It should be further noted that the embodiments described herein may be implemented (in whole or in part) as logical operations performed by programmable processing devices (for example, microprocessors and/or state machine circuitry) and/or interconnected discrete electronic components or hardware logic. The logical operations of, for example, delay circuitry 46 and 52, logic circuitry 26 and 34, logic 44 and 50, digital comparator circuitry 64 and margining analysis circuitry 68, may be implemented (1) as a sequence of computer implemented processes or program modules executed on a computing system and/or (2) as interconnected discrete electronic components or hardware logic—alone, in conjunction with, or within a computing system. Accordingly, the operations of, for example, delay circuitry 46 and 52, logic circuitry 26 and 34, and/or logic 44 and 50, may be implemented as discrete electronic components or hardware logic—alone, in conjunction with, or within a computing system that performs executable instructions, such as program modules, executed by one or more computers or other devices. Generally, program modules include routines, programs, objects, components, data structures, etc. that perform particular tasks or implement particular abstract data types. Typically the functionality of the program modules may be combined or distributed.

What is claimed is:

1. An equalization circuit to receive a plurality of input symbols and to generate an output signal wherein the output signal is representative of a transmitted symbol, the equalization circuit comprising:

a first data slicer having a plurality of inputs and an output, wherein a first input is adapted to receive the plurality of input symbols and a second input is adapted to receive a first slicer level, and wherein the first data slicer outputs a first or second value based on the amplitude of the input symbol relative to the first slicer level;

a second data slicer having a plurality of inputs and an output, wherein a first input of the second data slicer is adapted to receive the plurality of input symbols and a second input of the second data slicer is adapted to receive a second slicer level, and wherein the second data slicer outputs the first or second value based on the amplitude of the input symbol relative to the second slicer level; and logic circuitry, coupled to the first and second data slicers, to output a signal having either a first or second logic level wherein the first logic level is associated with the first value and the second logic level is associated with the second logic level, and wherein:

if the data slicers output the same value, the logic circuitry outputs the logic level that is associated with the value output by the data slicers; and if the data slicers output different values, the logic circuitry outputs the complement of the logic level of the immediately preceding input symbol.

2. The equalization circuit of claim 1 wherein the first and second data slicers each include at least one voltage comparator.

3. The equalization circuit of claim 2 wherein the first and second data slicers each include a plurality of serially coupled sense amplifiers.

4. The equalization circuit of claim 1 further including adaptive circuitry, coupled to the first data slicer, to determine the first slicer level during operation of the equalization circuit and to provide the first slicer level to the first data slicer.

5. A receiver, coupled to a communications channel, to receive a plurality of input symbols transmitted by a transmitter, and to generate an output signal that is representative of each transmitted symbol, the receiver comprising:

equalization circuitry, coupled to the communications channel to receive the plurality of input symbols, the equalization circuitry including:

a first data slicer having a plurality of inputs and an output, wherein a first input is adapted to receive the plurality of input symbols and a second input is adapted to receive a first slicer level, and wherein the first data slicer outputs a first or second value based on the amplitude of the input symbol relative to the first slicer level;

a second data slicer having a plurality of inputs and an output, wherein a first input of the second data slicer is adapted to receive the plurality of input symbols and a second input of the second data slicer is adapted to receive a second slicer level, and wherein the second data slicer outputs the first or second value based on the amplitude of the input symbol relative to the second slicer level;

logic circuitry, coupled to the first and second data slicers, to output a signal having either a first or second logic level wherein the first logic level is associated with the first value and the second logic level is associated with the second logic level, and wherein:

if the data slicers output the same value, the logic circuitry outputs the logic level that is associated with the value output by the data slicers; and if the data slicers output different values, the logic circuitry outputs the complement of the logic level of the immediately preceding input symbol; and a memory, coupled to the second input of each data slicers, wherein the memory stores information which is representative of the first and second slicer levels.

6. The receiver of claim 5 further including adaptive circuitry, coupled to the second input of each data slicers, wherein the adaptive circuitry adjusts the first and second slicer levels in accordance with the performance of the receiver.

7. The receiver of claim 5 further including adaptive circuitry, coupled to the second input of the first data slicer, wherein the adaptive circuitry changes the first data slicer level based on an upper edge and a lower edge of a receive eye of the first data slicer.

8. The receiver of claim 7 further including margining circuitry, coupled to the adaptive circuitry, wherein the margining circuitry determines the upper inner edge and the lower inner edge of the receive eye of the first data slicer.

9. The receiver of claim 8 wherein the margining circuitry includes a margining slicer having a plurality of inputs and an output, wherein a first input of the margining slicer is adapted to receive the plurality of input symbols and a second input is adapted to receive a margining slicer level, and wherein the margining slicer outputs a first or second value based on the amplitude of the input symbol relative to the margining slicer level.

10. The receiver of claim 9 wherein the margining circuitry includes reference level adjustment circuitry to generate the margining slicer level.

11. The receiver of claim 10 wherein the reference level adjustment circuitry generates margining slicer levels that vary according to the margining algorithm.

12. The receiver of claim 7 further including adaptive circuitry, coupled to the second input of the second slicer, wherein the adaptive circuitry changes the second slicer level based on an upper edge and a lower edge of a receive eye of the second slicer.

13. The receiver of claim 12 further including margining circuitry, coupled to the adaptive circuitry, wherein the margining circuitry determines the location of the upper inner edge and the lower inner edge of the receive eyes of the first and second slicer.

14. The receiver of claim 12 wherein the margining circuitry includes a margining slicer having a plurality of inputs and an output, wherein a first input of the margining slicer is adapted to receive the plurality of input symbols and a second input is adapted to receive a margining slicer level, and wherein the margining slicer outputs a first or second value based on the amplitude of the input symbol relative to the margining slicer level.

15. The receiver of claim 14 wherein the margining circuitry includes reference level adjustment circuitry to generate the margining slicer level.

16. The receiver of claim 15 wherein the reference level adjustment circuitry generates margining slicer levels that vary according to the margining algorithm.

17. The receiver of claim 15 further including:
a first phase slicer having a plurality of inputs and an output, wherein a first input is adapted to receive the plurality of input symbols and a second input is adapted to receive a first slicer level, and wherein the first phase slicer outputs a first or second value based on the amplitude of the input symbol relative to the first slicer level;
a second phase slicer having a plurality of inputs and an output, wherein a first input of the second phase slicer is adapted to receive the plurality of input symbols and a second input is adapted to receive a second slicer level, and wherein the second phase slicer outputs the first or second value based on the amplitude of the input symbol relative to the second slicer level;
margining circuitry to measure the value of an error signal of a phase sampling point; and
adaptive circuitry, coupled to margining circuitry and the second input of the first slicer, wherein the adaptive circuitry changes the first slicer level based on the value of the error signal.

18. The receiver of claim 17 wherein the margining circuitry includes a margining slicer having a plurality of inputs and an output, wherein a first input of the margining slicer is adapted to receive the plurality of input symbols and a second input is adapted to receive a margining slicer level, and wherein the margining slicer outputs a first or second value based on the amplitude of the input symbol relative to the margining slicer level.

19. A receiver, coupled to a communications channel, to receive a plurality of input symbols transmitted by a transmitter, and to generate an output signal that is representative of each transmitted symbol, the receiver comprising:
equalization circuitry, coupled to the communications channel to receive the plurality of input symbols, the equalization circuitry including:
a first data slicer having a plurality of inputs and an output, wherein a first input is adapted to receive the plurality of input symbols and a second input is adapted to receive a first slicer level, and wherein the first data slicer outputs a first or second value based on the amplitude of the input symbol relative to the first slicer level;
a second data slicer having a plurality of inputs and an output, wherein a first input of the second data slicer is adapted to receive the plurality of input symbols and a second input of the second data slicer is adapted to receive a second slicer level, and wherein the second data slicer outputs the first or second value based on the amplitude of the input symbol relative to the second slicer level;
logic circuitry, coupled to the first and second data slicers, to output a signal having either a first or second logic level wherein the first logic level is associated with the first value and the second logic level is associated with the second logic level, and wherein:
if the data slicers output the same value, the logic circuitry outputs the logic level that is associated with the value output by the data slicers; and
if the data slicers output different values, the logic circuitry outputs the complement of the logic level of the immediately preceding input symbol;
margining circuitry, including at least one margining slicer, to determine at least one performance parameter of the receiver; and
adaptive circuitry, coupled to the margining circuitry and the second input of the first data slicer, wherein the adaptive circuitry adjusts the first slicer level based on the at least one performance parameter.

20. The receiver of claim 19 wherein the at least one performance parameter of the receiver includes an upper inner edge and a lower inner edge of a receive eye of the first data slicer.

21. The receiver of claim 19 wherein the at least one performance parameter of the receiver includes an upper edge and a lower edge of a receive eye of the second data slicer.

22. The receiver of claim 19 wherein the at least one performance parameter of the receiver includes error signal of a phase sampling point.

23. The receiver of claim 19 wherein the margining slicer includes a plurality of inputs and an output, wherein a first input of the margining slicer is adapted to receive the plurality of input symbols and a second input is adapted to receive a margining slicer level, and wherein the margining slicer outputs a first or second value based on the amplitude of the input symbol relative to the margining slicer level.

24. The receiver of claim 23 wherein the margining circuitry includes reference level adjustment circuitry to generate the margining slicer level.

25. The receiver of claim 24 wherein the reference level adjustment circuitry generates margining slicer levels that vary according to the margining algorithm.

26. The receiver of claim 19 wherein the first, second and margining data slicers each include a plurality of serially coupled sense amplifiers.

* * * * *